US010788112B2

(12) United States Patent
Mathers et al.

(10) Patent No.: US 10,788,112 B2
(45) Date of Patent: Sep. 29, 2020

(54) HYDRO-MECHANICAL TRANSMISSION WITH MULTIPLE MODES OF OPERATION

(71) Applicant: Mathers Hydraulics Technologies Pty Ltd, Bridgeman Downs (AU)

(72) Inventors: Norman Ian Mathers, Brisbane (AU); Robert Price, Brisbane (AU)

(73) Assignee: Mathers Hydraulics Technologies Pty Ltd, Bridgeman Downs (AU)

( * ) Notice: Subject to any disclaimer, the term of this patent is extended or adjusted under 35 U.S.C. 154(b) by 611 days.

(21) Appl. No.: 15/544,829

(22) PCT Filed: Jan. 18, 2016

(86) PCT No.: PCT/IB2016/000090
§ 371 (c)(1),
(2) Date: Jul. 19, 2017

(87) PCT Pub. No.: WO2016/116809
PCT Pub. Date: Jul. 28, 2016

(65) Prior Publication Data
US 2018/0010676 A1      Jan. 11, 2018

Related U.S. Application Data

(60) Provisional application No. 62/104,975, filed on Jan. 19, 2015.

(51) Int. Cl.
*F16H 47/02*       (2006.01)
*F16H 61/44*       (2006.01)
(Continued)

(52) U.S. Cl.
CPC ............. *F16H 47/02* (2013.01); *B60K 17/10* (2013.01); *F16D 3/68* (2013.01); *F16D 31/00* (2013.01);
(Continued)

(58) Field of Classification Search
CPC .... F16H 47/02; F16H 61/44; F16H 2047/025; B60K 17/10
(Continued)

(56) References Cited

U.S. PATENT DOCUMENTS 983,754 A    2/1911  Nichols
2,003,615 A  6/1935  Smith et al.
(Continued)

FOREIGN PATENT DOCUMENTS

AU    2010320606 B2    2/2017
AU    2017202300 B2   10/2018
(Continued)

OTHER PUBLICATIONS

"U.S. Appl. No. 15/561,410, Non Final Office Action dated Mar. 22, 2019", 10 pgs.
(Continued)

*Primary Examiner* — Ha Dinh Ho
(74) *Attorney, Agent, or Firm* — Schwegman Lundberg & Woessner, P.A.

(57) ABSTRACT

Various vehicle systems capable of different operation modes are disclosed. According to one example, the system can include at least one input shaft, at least one output shaft, a plurality of hydraulic devices, and one or more accessories. The plurality of hydraulic devices can be configured to be operable as vane pumps in a retracted vane mode of operation and can be configured to be operable as a hydraulic couplings to couple the at least one input shaft with the at least one output shaft in a vane extended mode of operation. The plurality of hydraulic devices can be simultaneously operable as the hydraulic couplings and the vane pumps. The one or more accessories can be in fluid communication with the plurality of hydraulic devices and can be configured to receive a hydraulic fluid pumped from one or more the plurality of hydraulic devices when operating as the vane pumps.

22 Claims, 9 Drawing Sheets

(51) Int. Cl.
*B60K 17/10* (2006.01)
*F16D 3/68* (2006.01)
*F16D 31/00* (2006.01)
*F16D 31/06* (2006.01)
*F16H 61/444* (2010.01)
*F16D 33/00* (2006.01)

(52) U.S. Cl.
CPC .............. *F16D 31/06* (2013.01); *F16H 61/44* (2013.01); *F16H 61/444* (2013.01); *F16D 33/00* (2013.01); *F16H 2047/025* (2013.01)

(58) Field of Classification Search
USPC ........................................................ 74/730.1
See application file for complete search history.

(56) References Cited

U.S. PATENT DOCUMENTS

| | | |
|---|---|---|
| 2,570,411 A | 10/1951 | Vickers |
| 2,696,790 A | 12/1954 | Crow |
| 2,919,651 A | 1/1960 | Gardiner |
| 2,962,972 A | 12/1960 | Meter |
| 2,962,973 A | 12/1960 | Bruce |
| 2,967,488 A | 1/1961 | Gardiner |
| 2,982,223 A | 5/1961 | Rosaen et al. |
| 2,985,467 A | 5/1961 | Cable, Jr. et al. |
| 3,035,554 A | 5/1962 | Selzler |
| 3,042,163 A | 7/1962 | Lapsley |
| 3,102,494 A | 9/1963 | Adams et al. |
| 3,120,154 A | 2/1964 | Gilreath |
| 3,149,845 A | 9/1964 | Knox |
| 3,160,147 A | 12/1964 | Hanson et al. |
| 3,208,570 A | 9/1965 | Aschauer |
| 3,223,044 A | 12/1965 | Adams et al. |
| 3,254,606 A | 6/1966 | Rosaen |
| 3,320,897 A | 5/1967 | Eickmann |
| 3,362,340 A | 1/1968 | Adams |
| 3,401,641 A | 9/1968 | Adams et al. |
| 3,407,742 A | 10/1968 | Mitchell et al. |
| 3,421,413 A | 1/1969 | Adams et al. |
| 3,451,346 A | 6/1969 | Pettibone et al. |
| 3,533,493 A * | 10/1970 | Braun ................ B60K 3/04 477/30 |
| 3,578,888 A | 5/1971 | Adams |
| 3,586,466 A | 6/1971 | Erickson |
| 3,597,998 A * | 8/1971 | Ebert ................ F16H 47/04 475/74 |
| 3,640,651 A | 2/1972 | Johnson |
| 3,790,314 A | 2/1974 | Swain et al. |
| 3,792,585 A | 2/1974 | Eisenmann et al. |
| 3,895,565 A | 7/1975 | Schottler |
| 3,929,356 A | 12/1975 | Devincent et al. |
| 3,944,263 A | 3/1976 | Arnold |
| 4,037,409 A * | 7/1977 | Leibach ................ B60K 6/105 60/413 |
| 4,132,512 A | 1/1979 | Roberts et al. |
| 4,248,309 A | 2/1981 | Hofle et al. |
| 4,260,343 A | 4/1981 | Watanabe et al. |
| 4,272,227 A | 6/1981 | Woodruff et al. |
| 4,274,010 A | 6/1981 | Lawson-Tancred |
| 4,350,220 A * | 9/1982 | Carman ................ B60K 6/12 180/165 |
| 4,354,809 A | 10/1982 | Sundberg et al. |
| 4,406,599 A | 9/1983 | Stephan |
| 4,412,789 A | 11/1983 | Ohe et al. |
| 4,431,389 A | 2/1984 | Johnson |
| 4,441,573 A * | 4/1984 | Carman ................ B60K 6/12 180/165 |
| 4,472,119 A | 9/1984 | Roberts |
| 4,505,654 A | 3/1985 | Dean, Jr. et al. |
| 4,516,919 A | 5/1985 | Roberts |
| 4,629,406 A | 12/1986 | Tantardini |
| 4,646,521 A | 3/1987 | Snyder |
| 4,659,297 A | 4/1987 | Kahrs |
| 4,674,280 A | 6/1987 | Stuhr |
| 4,913,636 A | 4/1990 | Niemiec et al. |
| 5,029,461 A | 7/1991 | Lawrence et al. |
| 5,064,362 A | 11/1991 | Hansen et al. |
| 5,170,636 A | 12/1992 | Hitosugi |
| 5,385,458 A | 1/1995 | Chu |
| 5,509,793 A | 4/1996 | Cherry |
| 5,551,484 A | 9/1996 | Charboneau |
| 5,655,369 A | 8/1997 | Folsom et al. |
| 5,657,629 A | 8/1997 | Folsom et al. |
| 5,733,109 A | 3/1998 | Sundberg et al. |
| 5,904,043 A | 5/1999 | Nagatomo |
| 6,015,278 A | 1/2000 | Key et al. |
| 6,056,329 A | 5/2000 | Kitani et al. |
| 6,135,742 A | 10/2000 | Cho et al. |
| 6,634,865 B2 | 10/2003 | Dalton |
| 6,817,438 B2 | 11/2004 | Modrzejewski et al. |
| 7,070,399 B2 | 7/2006 | Konishi et al. |
| 7,083,394 B2 | 8/2006 | Dalton |
| 7,094,044 B2 | 8/2006 | Strueh |
| 7,686,602 B1 | 3/2010 | Landhuis |
| 7,914,411 B2 | 3/2011 | Basteck |
| 7,955,062 B2 | 6/2011 | Mathers |
| 8,535,030 B2 | 9/2013 | Chua et al. |
| 8,584,452 B2 | 11/2013 | Lloyd et al. |
| 8,597,002 B2 | 12/2013 | Mathers |
| 8,691,063 B2 | 4/2014 | Aleksandrov |
| 8,708,679 B2 | 4/2014 | Mathers |
| 9,400,043 B2 | 7/2016 | Mathers et al. |
| 9,638,188 B2 | 5/2017 | Mathers |
| 9,874,270 B2 | 1/2018 | Mathers |
| 10,428,798 B2 | 10/2019 | Mathers |
| 10,487,657 B2 | 11/2019 | Mathers et al. |
| 2004/0047741 A1 | 3/2004 | Dalton |
| 2004/0136853 A1 | 7/2004 | Clements et al. |
| 2004/0219046 A1 | 11/2004 | Johnson et al. |
| 2006/0133946 A1 | 6/2006 | Mathers |
| 2008/0310988 A1 | 12/2008 | Mathers |
| 2009/0280021 A1 | 11/2009 | Mathers |
| 2010/0028181 A1 | 2/2010 | Mathers |
| 2010/0028641 A1 | 2/2010 | Zhu et al. |
| 2010/0154402 A1 | 6/2010 | Cho |
| 2010/0244447 A1 | 9/2010 | Gopalswamy et al. |
| 2013/0067899 A1 | 3/2013 | Mathers |
| 2014/0138958 A1 | 5/2014 | Verdegem |
| 2014/0291045 A1 | 10/2014 | Collett et al. |
| 2014/0328709 A1 | 11/2014 | Mathers |
| 2015/0128581 A1 | 5/2015 | Mathers |
| 2015/0184641 A1 | 7/2015 | Crane et al. |
| 2015/0338003 A1 | 11/2015 | Saito et al. |
| 2016/0178104 A1 | 6/2016 | Queau et al. |
| 2016/0194959 A1 | 7/2016 | Pekrul |
| 2018/0023738 A1 | 1/2018 | Mathers |
| 2018/0094712 A1 | 4/2018 | Mathers |
| 2018/0106152 A1 | 4/2018 | Mathers et al. |
| 2018/0298881 A1 | 10/2018 | Mathers |
| 2020/0011180 A1 | 1/2020 | Mathers |

FOREIGN PATENT DOCUMENTS

| | | |
|---|---|---|
| CN | 1186173 | 7/1998 |
| CN | 1833901 A | 9/2006 |
| CN | 1853031 A | 10/2006 |
| CN | 2924153 Y | 7/2007 |
| CN | 101081596 A | 12/2007 |
| CN | 101233297 A | 7/2008 |
| CN | 101490420 A | 7/2009 |
| CN | 101233297 B | 9/2010 |
| CN | 102562208 A | 7/2012 |
| CN | 102753851 A | 10/2012 |
| CN | 103052796 A | 4/2013 |
| CN | 103510988 A | 1/2014 |
| CN | 103511219 A | 1/2014 |
| CN | 103758976 A | 4/2014 |
| CN | 103836093 A | 6/2014 |
| CN | 104471251 A | 3/2015 |
| CN | 102753851 B | 8/2016 |
| CN | 106090065 A | 11/2016 |
| CN | 107428241 A | 12/2017 |

(56) References Cited

FOREIGN PATENT DOCUMENTS

| | | |
|---|---|---|
| CN | 107709704 A | 2/2018 |
| CN | 108431406 A | 8/2018 |
| CN | 108848674 A | 11/2018 |
| CN | 106090065 B | 3/2019 |
| CN | 110023667 A | 7/2019 |
| CN | 110382822 A | 10/2019 |
| DE | 1653801 A1 | 6/1971 |
| DE | 1728268 A1 | 3/1972 |
| DE | 2165530 A1 | 7/1973 |
| DE | 4136151 A1 | 5/1993 |
| DE | 112007001338 T5 | 4/2009 |
| DE | 102011082725 A1 | 3/2013 |
| DE | 102012013152 A1 | 1/2014 |
| EP | 0051192 A1 | 5/1982 |
| EP | 0087401 A1 | 8/1983 |
| EP | 0384335 A1 | 8/1990 |
| EP | 0399387 A2 | 11/1990 |
| EP | 0399387 B1 | 9/1992 |
| EP | 1536138 | 6/2005 |
| EP | 1779903 B1 | 3/2010 |
| EP | 1660756 B1 | 5/2018 |
| EP | 3365555 B1 | 9/2019 |
| FR | 2944071 A3 | 10/2010 |
| GB | 1513208 A | 6/1978 |
| GB | 2015084 A | 9/1979 |
| GB | 2042642 A | 9/1980 |
| GB | 2176537 A | 12/1986 |
| IN | 5265DELNP2012 A1 | 8/2016 |
| IN | 201717028529 A | 10/2017 |
| IN | 201717036365 A | 12/2017 |
| IN | 201817018393 A | 9/2018 |
| IN | 201817026903 A | 11/2018 |
| IN | 201917006576 A | 5/2019 |
| IN | 201917036435 A | 11/2019 |
| JP | S5322204 U | 2/1978 |
| JP | S55112085 U | 8/1980 |
| JP | 2002275979 A | 9/2002 |
| JP | 2003172272 A | 6/2003 |
| JP | 2005351117 A | 12/2005 |
| JP | 2009539006 A | 11/2009 |
| JP | 5200009 A | 2/2013 |
| WO | WO-1981001444 A1 | 5/1981 |
| WO | WO-199401179 A1 | 1/1994 |
| WO | WO-9508047 A1 | 3/1995 |
| WO | WO-2004000951 A1 | 12/2003 |
| WO | WO-2005005782 A1 | 1/2005 |
| WO | WO-2006119574 A1 | 11/2006 |
| WO | WO-2007140514 A1 | 12/2007 |
| WO | WO-2011011682 A2 | 1/2011 |
| WO | WO-2011061630 A2 | 5/2011 |
| WO | 2012015850 | 2/2012 |
| WO | WO-2013140305 A1 | 9/2013 |
| WO | WO-2015123784 A1 | 8/2015 |
| WO | WO-2016065392 A1 | 5/2016 |
| WO | 2016116809 | 7/2016 |
| WO | WO-2016149740 A1 | 9/2016 |
| WO | WO-2017066826 A1 | 4/2017 |
| WO | WO-2017106909 A1 | 6/2017 |
| WO | WO-2018014082 A1 | 1/2018 |
| WO | WO-2018161108 A1 | 9/2018 |

OTHER PUBLICATIONS

"Eurasian Application Serial No. 201791637, Office Action dated Feb. 27, 2019", W/English Translation, 6 pgs.
"European Application Serial No. 16767517.2, Response Filed Apr. 29, 2019 to Extended European Search Report dated Oct. 8, 2018", 56 pgs.
"U.S. Appl. No. 15/561,410, Preliminary Amendment filed Sep. 25, 2017", 10 pgs.
"European Application Serial No. 16739836.1, Response filed Feb. 23, 2018", 8 pgs.
"International Application Serial No. PCT/AU2016/000108, International Preliminary Report on Patentability dated Oct. 5, 2017", 8 pgs.
"International Application Serial No. PCT/AU2016/000108, International Search Report dated Jun. 7, 2016", 7 pgs.
"International Application Serial No. PCT/AU2016/000108, Written Opinion dated Jun. 7, 2016", 6 pgs.
"European Application Serial No. 16739836.1, Extended European Search Report dated Sep. 6, 2018", 5 pgs.
"U.S. Appl. No. 15/561,410, Notice of Allowance dated Jul. 17, 2019", 5 pgs.
"U.S. Appl. No. 15/561,410, Response filed Jun. 21, 2019 to Non-Final Office Action dated Mar. 22, 2019", 10 pgs.
"Chinese Application Serial No. 201680030371.1, Office Action dated May 30, 2019", with English translation of claims, 9 pgs.
"Eurasian Application Serial No. 201791637, Response filed Jun. 27, 2019 to Office Action dated Feb. 27, 2019", w/ English Claims, 15 pgs.
"U.S. Appl. No. 11/914,203, Notice of Allowance dated Feb. 1, 2011", 12 pgs.
"U.S. Appl. No. 11/914,203, Preliminary Amendment filed Nov. 12, 2007", 8 pgs.
"U.S. Appl. No. 11/914,203, Response filed Nov. 29, 2010 to Restriction Requirement dated Nov. 4, 2010", 8 pgs.
"U.S. Appl. No. 11/914,203, Restriction Requirement dated Nov. 4, 2010", 7 pgs.
"U.S. Appl. No. 12/303,224 , Response filed Feb. 13, 2013 to Final Office Action dated Sep. 13, 2012", 11 pgs.
"U.S. Appl. No. 12/303,224, Final Office Action dated Sep. 13, 2012", 14 pgs.
"U.S. Appl. No. 12/303,224, Non Final Office Action dated Jan. 19, 2012", 10 pgs.
"U.S. Appl. No. 12/303,224, Notice of Allowance dated Nov. 12, 2013", 15 pgs.
"U.S. Appl. No. 12/303,224, Preliminary Amendment filed Jun. 30, 2010", 4 pgs.
"U.S. Appl. No. 12/303,224, Preliminary Amendment filed Dec. 2, 2008", 5 pgs.
"U.S. Appl. No. 12/303,224, PTO Response to 312 Communication dated Apr. 1, 2014", 2 pgs.
"U.S. Appl. No. 12/303,224, Response filed May 18, 2012 to Non Final Office Action dated Jan. 19, 2012", 8 pgs.
"U.S. Appl. No. 12/303,224, Response filed Oct. 26, 2011 to Restriction Requirement dated Oct. 5, 2011", 3 pgs.
"U.S. Appl. No. 12/303,224, Restriction Requirement dated Oct. 5, 2011", 7 pgs.
"U.S. Appl. No. 12/466,280, Non Final Office Action dated Aug. 22, 2012", 18 pgs.
"U.S. Appl. No. 12/466,280, Notice of Allowance dated Apr. 29, 2013", 13 pgs.
"U.S. Appl. No. 12/466,280, PTO Response to 312 Amendment dated Jul. 25, 2013", 2 pgs.
"U.S. Appl. No. 12/466,280, PTO Response to 312 Amendment dated Oct. 31, 2013", 2 pgs.
"U.S. Appl. No. 12/466,280, Response filed Feb. 22, 2013 to Non Final Office Action dated Aug. 22, 2012", 16 pgs.
"U.S. Appl. No. 12/466,280, Response filed Jun. 28, 2012 to Restriction Requirement dated May 30, 2012", 9 pgs.
"U.S. Appl. No. 12/466,280, Restriction Requirement dated May 30, 2012", 6 pgs.
"U.S. Appl. No. 13/510,643, Non Final Office Action dated Aug. 13, 2015", 9 pgs.
"U.S. Appl. No. 13/510,643, Notice of Allowance dated Mar. 23, 2016", 7 pgs.
"U.S. Appl. No. 13/510,643, Preliminary Amendment dated May 17, 2012", 7 pgs.
"U.S. Appl. No. 13/510,643, Response filed Feb. 15, 2016 to Non Final Office Action dated Aug. 13, 2015", 11 pgs.
"U.S. Appl. No. 14/095,654, Examiner Interview Summary dated Sep. 6, 2016", 3 pgs.
"U.S. Appl. No. 14/095,654, Examiner Interview Summary dated Nov. 23, 2015", 3 pgs.
"U.S. Appl. No. 14/095,654, Final Office Action dated Jul. 8, 2016", 10 pgs.

(56) References Cited

OTHER PUBLICATIONS

"U.S. Appl. No. 14/095,654, Final Office Action dated Oct. 19, 2015", 24 pgs.
"U.S. Appl. No. 14/095,654, Non Final Office Action dated Feb. 11, 2016", 17 pgs.
"U.S. Appl. No. 14/095,654, Non Final Office Action dated Nov. 6, 2014", 14 pgs.
"U.S. Appl. No. 14/095,654, Notice of Allowance dated Sep. 26, 2016", 5 pgs.
"U.S. Appl. No. 14/095,654, PTO Response to Rule 312 Communication dated Apr. 5, 2017", 2 pgs.
"U.S. Appl. No. 14/095,654, Response filed Jan. 19, 2016 to Final Office Action dated Oct. 19, 2015", 14 pgs.
"U.S. Appl. No. 14/095,654, Response filed Apr. 6, 2015 to Non Final Office Action dated Nov. 6, 2014", 12 pgs.
"U.S. Appl. No. 14/095,654, Response filed May 9, 2016 to Non Final Office Action dated Feb. 11, 2016", 11 pgs.
"U.S. Appl. No. 14/095,654, Response filed Aug. 27, 2015 to Restriction Requirement dated May 29, 2015", 6 pgs.
"U.S. Appl. No. 14/095,654, Response filed Sep. 7, 2016 to Final Office Action dated Jul. 8, 2016", 8 pgs.
"U.S. Appl. No. 14/095,654, Restriction Requirement dated May 29, 2015", 6 pgs.
"U.S. Appl. No. 14/599,746, Non Final Office Action dated Apr. 19, 2017", 10 pgs.
"U.S. Appl. No. 14/599,746, Notice of Allowance dated Sep. 13, 2017", 7 pgs.
"U.S. Appl. No. 14/599,746, Preliminary Amendment filed Jan. 20, 2015", 6 pgs.
"U.S. Appl. No. 14/599,746, Response filed Jul. 19, 2017 to Non Final Office Action dated Apr. 19, 2017", 12 pgs.
"U.S. Appl. No. 15/654,418, Non Final Office Action dated Oct. 15, 2019", 7 pgs.
"U.S. Appl. No. 15/654,418, Response filed Jan. 15, 2020 to Non Final Office Action dated Oct. 15, 2019", 14 pgs.
"U.S. Appl. No. 15/654,418, Response filed Jul. 26, 2019 to Restriction Requirement dated May 30, 2019", 8 pgs.
"U.S. Appl. No. 15/654,418, Restriction Requirement dated May 30, 2019", 5 pgs.
"U.S. Appl. No. 15/767,902, Non Final Office Action dated Jan. 28, 2019", 6 pgs.
"U.S. Appl. No. 15/767,902, Notice of Allowability dated Aug. 12, 2019", 2 pgs.
"U.S. Appl. No. 15/767,902, Notice of Allowance dated May 24, 2019", 5 pgs.
"U.S. Appl. No. 15/767,902, Preliminary Amendment filed Apr. 12, 2018", 10 pgs.
"U.S. Appl. No. 15/767,902, Response filed Apr. 19, 2019 to Non Final Office Action dated Jan. 28, 2019", 11 pgs.
"U.S. Appl. No. 15/835,058, Non Final Office Action dated Aug. 6, 2019", 11 pgs.
"U.S. Appl. No. 15/835,058, Notice of Allowance dated Jan. 31, 2020", 7 pgs.
"U.S. Appl. No. 15/835,058, Preliminary Amendment filed Jan. 5, 2018", 8 pgs.
"U.S. Appl. No. 15/835,058, Response filed Nov. 6, 2019 to Non-Final Office Action dated Aug. 6, 2019", 17 pgs.
"U.S. Appl. No. 16/063,822, Preliminary Amendment filed Jun. 19, 2018", 8 pgs.
"U.S. Appl. No. 16/491,112, Preliminary Amendment filed Sep. 11, 2019", 8 pgs.
"Application Serial No. PCT/AU2015/000639, Invitation to Pay Additional Fees and Partial Search Report dated Nov. 6, 2015", 2 pgs.
"Australian Application Serial No. 2010320606, First Examination Report dated Jul. 5, 2016", 3 pgs.
"Australian Application Serial No. 2010320606, Response filed Jan. 4, 2017 to First Examination Report dated Jul. 5, 2016", 14 pgs.
"Australian Application Serial No. 2017202300, First Examination Report dated Jun. 14, 2018", 4 pgs.
"Australian Application Serial No. 2017202300, Response filed Sep. 7, 2018 to First Examination Report dated Jun. 14, 2018", 6 pgs.
"Chinese Application Serial No. 200680025085.2, Office Action dated Oct. 17, 2008", (w/ English Translation), 10 pgs.
"Chinese Application Serial No. 201080052336.2 Response filed Nov. 6, 2014 to Final Office Action dated Apr. 21, 2014", (w/ English Translation of Claims), 14 pgs.
"Chinese Application Serial No. 201080052336.2, Office Action dated Feb. 9, 2015", (w/ English Translation), 9 pgs.
"Chinese Application Serial No. 201080052336.2, Office Action dated Apr. 21, 2014", (w/ English Translation), 12 pgs.
"Chinese Application Serial No. 201080052336.2, Office Action dated Oct. 13, 2015", with English translation of claims, 7 pgs.
"Chinese Application Serial No. 201080052336.2, Response filed Feb. 29, 2016 to Office Action dated Oct. 13, 2015", with English translation of claims, 8 pgs.
"Chinese Application Serial No. 201080052336.2, Response filed Jun. 24, 2015 to Office Action dated Feb. 9, 2015", (w/ English Translation of Claims), 12 pgs.
"Chinese Application Serial No. 201610605209.X, Office Action dated Jan. 11, 2018", w/ English Translation, 12 pgs.
"Chinese Application Serial No. 201610605209.X, Office Action dated Sep. 30, 2018", w/ English translation, 12 pgs.
"Chinese Application Serial No. 201610605209.X, Response Filed Jan. 11, 2019 to Examiner Interview Jan. 8, 2019", with machine translation, 30 pgs.
"Chinese Application Serial No. 201610605209.X, Response filed May 25, 2018 to Office Action dated Jan. 11, 2018", with machine translation, 18 pgs.
"Chinese Application Serial No. 201610605209.X, Response Filed Nov. 19, 2018 to Office Action dated Sep. 30, 2018", with English translation of claims, 9 pgs.
"Chinese Application Serial No. 201680061659.5, Office Action dated Apr. 25, 2019", w/ English translation, 18 pgs.
"Chinese Application Serial No. 201680061659.5, Office Action dated Nov. 25, 2019", w/o English Translation, 3 pgs.
"Chinese Application Serial No. 201680061659.5, Response filed Jan. 16, 2020 to Office Action dated Nov. 25, 2019", w/ English Claims, 17 pgs.
"Chinese Application Serial No. 201680061659.5, Response filed Aug. 27, 2019 to Office Action dated Apr. 25, 2019", w/ English Claims, 22 pgs.
"Chinese Application Serial No. 201680061659.5, Voluntary Amendment Filed Feb. 1, 2019", w/English Claims, 22 pgs.
"Eurasian Application Serial No. 201791637, Office Action dated Oct. 8, 2019", w/ English Translation, 4 pgs.
"Eurasian Application Serial No. 201791637, Response filed Jan. 16, 2020 to Office Action dated Oct. 8, 2019", w/ English Claims, 16 pgs.
"Eurasian Application Serial No. 201891020, Office Action dated Oct. 21, 2019", w/ English Translation, 4 pgs.
"Eurasian Application Serial No. 201891020, Response filed Jan. 9, 2020 to Office Action dated Oct. 21, 2019", w/ English Claims, 17 pgs.
"European Application Serial No. 04761081, Supplementary Partial European Search Report dated Mar. 31, 2011", 2 pgs.
"European Application Serial No. 04761081.1, Communication Pursuant to Article 94(3) EPC dated Feb. 24, 2017", 6 pgs.
"European Application U.S. Appl. No. 04761081.1, Communication Pursuant to Article 94(3) EPC dated May 31, 2016", 6 pgs.
"European Application Serial No. 04761081.1, Office Action dated Apr. 11, 2012", 7 pgs.
"European Application Serial No. 04761081.1, Response filed Feb. 4, 2013 to Office Action dated Apr. 11, 2012", 12 pgs.
"European Application Serial No. 04761081.1, Response filed May 8, 2017 to Communication Pursuant to Article 94(3) EPC dated Feb. 24, 2017", 11 pgs.
"European Application Serial No. 04761081.1, Response filed Dec. 12, 2016 to Communication Pursuant to Article 94(3) EPC dated May 31, 2016", 23 pgs.
"European Application Serial No. 04761081.1, Supplementary European Search Report dated Apr. 14, 2011", 3 pgs.

(56) References Cited

OTHER PUBLICATIONS

"European Application Serial No. 10831224.0, Extended European Search Report dated Feb. 6, 2018", 6 pgs.
"European Application Serial No. 10831224.0, Further Response filed Sep. 7, 2018 to Extended European Search Report dated Feb. 6, 2018", 26 pgs.
"European Application Serial No. 10831224.0, Further Response filed Oct. 5, 2018 to Extended European Search Report dated Feb. 6, 2018", 24 pgs.
"European Application Serial No. 10831224.0, Response filed Sep. 5, 2018 to Extended European Search Report dated Feb. 6, 2018", 49 pgs.
"European Application Serial No. 16767517.2, Communication Pursuant to Article 94(3) EPC dated Nov. 14, 2019", 4 pgs.
"European Application Serial No. 16876998.2, Extended European Search Report dated Jun. 12, 2019", 8 pgs.
"European Application Serial No. 16876998.2, Response filed Jan. 8, 2020 to Extended European Search Report dated Jun. 12, 2019", 19 pgs.
"European Application Serial No. 16876998.2, Response filed Aug. 3, 2018", 13 pgs.
"European Application Serial No. 18763798.8, Extended European Search Report dated Dec. 5, 2019", 8 pgs.
"European Application U.S. Appl. no. 16856481.3, Extended European Search Report dated Oct. 10, 2018", 5 pgs.
"European Application Serial No. 16856481.3, Response filed Feb. 28, 2019 to Extended European Search Report dated Oct. 10, 2018", 20 pgs.
"German Application Serial No. 112007001338.9, Office Action dated Jan. 20, 2017", with English translation of claims, 12 pgs.
"German Application Serial No. 112007001338.9, Respose filed Jul. 24, 2017 to Office Action dated Jan. 20, 2017", w/o English Translation, 3 pgs.
"Germany Application Serial No. 112006001186,3, Office Action dated Nov. 20, 2015", W/ English Translation, 11 pgs.
"Germany Application Serial No. 112006001186.3, Response filed Apr. 15, 2016 to Office Action dated Nov. 20, 2015", with English translation of claims, 42 pgs.
"Indian Application Serial No. 4640/KOLNP/2007, First Examiner Report dated Jul. 15, 2016", 8 pgs.
"Indian Application Serial No. 4640/KOLNP/2007, Office Action dated Aug. 7, 2017", 2 pgs.
"Indian Application Serial No. 4640/KOLNP/2007, Response filed Sep. 22, 2017 to Office Action dated Aug. 7, 2017", w/ English Translation, 16 pgs.
"Indian Application Serial No. 4640/KOLNP/2007, Response filed Jan. 10, 2017 to First Examiner Report dated Jul. 15, 2016", 11 pgs.
"Indian Application Serial No. 4859/KOLNP/2008, First Examiner Report dated Sep. 25, 2017", w/ English Translation, 6 pgs.
"Indian Application Serial No. 4859/KOLNP/2008, Response filed Mar. 23, 2018 to First Examiner Report dated Sep. 25, 2017", w/ English Translation, 8 pgs.
"Indian Application Serial No. 5265/DELNP/2012, Amendment filed Jul. 4, 2012", 8 pgs.
"Indian Application Serial No. 5265/DELNP/2012, First Examination Report dated Sep. 20, 2018", W/ English Translation, 7 pgs.
"Indian Application Serial No. 5265/DELNP/2012, Response filed Mar. 22, 2019 to Examination Report dated Sep. 20, 2018", 22 pgs.
"International Application No. PCT/IB2010/003161, International Preliminary Report on Patentability dated May 31, 2012", (May 31, 2012), 8 pgs.
"International Application Ser. No. PCT/AU2006/000623, International Preliminary Report for Patentability dated Nov. 13, 2007", 6 pgs.
"International Application Ser. No. PCT/AU2006/000623, International Search Report dated Sep. 4, 2006", 4 pgs.
"International Application Ser. No. PCT/AU2006/000623, Written Opinion dated Sep. 4, 2006", 5 pgs.
"International Application Serial No. PCT!AU2007/000772, International Search Report dated Jul. 23, 2007", 3 pgs.

"International Application Serial No. PCT/AU2007/000772, Written Opinion dated Jul. 23, 2007", 6 pgs.
"International Application Serial No. PCT/AU2004/000951, International Preliminary Report on Patentability dated Nov. 4, 2005", 9 pgs.
"International Application Serial No. PCT/AU2004/000951, International Search Report dated Sep. 13, 2004", 3 pgs.
"International Application Serial No. PCT/AU2004/000951, Written Opinion dated Sep. 13, 2004", 4 pgs.
"International Application Serial No. PCT/AU2007/000772, International Preliminary Report on Patentability dated Apr. 21, 2008", 6 pgs.
"International Application Serial No. PCT/AU2015/000639, International Search Report dated Dec. 17, 2015", 6 pgs.
"International Application Serial No. PCT/AU2015/000639, Written Opinion dated Dec. 17, 2015", 6 pgs.
"International Application Serial No. PCT/AU2016/050967, International Preliminary Report on Patentability dated May 3, 2018", 6 pgs.
"International Application Serial No. PCT/AU2016/050967, International Search Report dated Dec. 21, 2016", 9 pgs.
"International Application Serial No. PCT/AU2016/050967, Written Opinion dated Dec. 21, 2016", 4 pgs.
"International Application Serial No. PCT/AU2016/051256, International Preliminary Report on Patentability dated Jul. 5, 2018", 8 pgs.
"International Application Serial No. PCT/AU2016/051256, International Search Report dated Apr. 24, 2017", 6 pgs.
"International Application Serial No. PCT/AU2016/051256, Written Opinion dated Apr. 24, 2017", 6 pgs.
"International Application Serial No. PCT/AU2017/050744, International Preliminary Report on Patentability dated Jan. 31, 2019", 9 pgs.
"International Application Serial No. PCT/AU2017/050744, International Search Report dated Sep. 29, 2017", 4 pgs.
"International Application Serial No. PCT/AU2017/050744, Written Opinion dated Sep. 29, 2017", 7 pgs.
"International Application Serial No. PCT/AU2018/050180, International Preliminary Report on Patentability dated Sep. 19, 2019", 8 pgs.
"International Application Serial No. PCT/AU2018/050180, International Search Report dated May 15, 2018", 5 pgs.
"International Application Serial No. PCT/AU2018/050180, Written Opinion dated May 15, 2018", 6 pgs.
"International Application Serial No. PCT/IB2010/003161, International Search Report and Written Opinion dated May 11, 2011", (May 11, 2011), 11 pgs.
"International Application Serial No. PCT/IB2010/003161, Written Opinion dated May 11, 2011", (May 11, 2011), 13 pgs.
"Japanese Application Serial No. 2009-512374, Notice of Allowance dated Jan. 15, 2013", with English translation, 6 pgs.
"Japanese Application Serial No. 2009-512374, Office Action dated May 8, 2012", (w/ English Translation), 4 pgs.
"Japanese Application Serial No. 2009-512374, Response filed Aug. 3, 2012 to Office Action dated May 8, 2012", (w/ English Translation of Claims), 7 pgs.
"Japanese Application Serial No. 2012-539437, Voluntary Amendment filed Dec. 27, 2012", (w/ English Translation of Claims), 10 pgs.
"Chinese Application Serial No. 20168003037.1, Voluntary Amendment filed", with English translation of claims, 10 pgs.
"European Application Serial No. 16739836.1, Response Filed Jan. 11, 2019 to Extended European Search Report dated Sep. 6, 2018", 23 pgs.
"Chinese Application Serial No. 201680012390.1, Office Action dated Jun. 17, 2019", w/ English translation, 25 pgs.
"European Application Serial No. 16767517.2, Extended European Search Report dated Oct. 8, 2018", 6 pgs.
"International Application Serial No. PCT/IB2016/000090, International Preliminary Report on Patentability dated Aug. 3, 2017", 6 pgs.
"International Application Serial No. PCT/IB2016/000090, Written Opinion dated May 2, 2016", 4 pgs.

(56) References Cited

OTHER PUBLICATIONS

"International Application Serial No. PCT/IB2016/000090, International Search Report dated May 2, 2016", 4 pgs.
"European Application Serial No. 16767517.2, Response filed May 7, 2018 to Communication pursuant to Rules 161(2) and 162 EPC, dated Nov. 7, 2017", 13 pgs.
"European Application Serial No. 16767517.2, Response filed Feb. 25, 2020 to Communication Pursuant to Article 94(3) EPC dated Nov. 14, 2019", 47 pgs.
"U.S. Appl. No. 15/654,418, Final Office Action dated Mar. 2, 2020", 7 pgs.
"Chinese Application Serial No. 201680012390.1, Office Action dated Feb. 3, 2020", w English Translation, 24 pgs.
"Australian Application Serial No. 2019200036, First Examination Report dated Mar. 25, 2020", 2 pgs.
"Chinese Application Serial No. 201680012390.1, Response filed Mar. 26, 2020 to Office Action dated Feb. 3, 2020", w English Claims, 20 pgs.
"Australian Application Serial No. 2019200036, Subsequent Examiners Report dated Apr. 8, 2020", 3 pgs.

\* cited by examiner

HYDRO-MECHANICAL TRANSMISSION WITH MULTIPLE MODES OF OPERATION

CLAIM OF PRIORITY

This application is a U.S. National Stage Filing under 35 U.S.C. § 371 of International Patent Application Ser. No. PCT/IB2016/000090, filed Jan. 18, 2016, and published on Jul. 28, 2016 as WO/2016/116809, which claims the benefit of priority to U.S. Provisional Patent Application Ser. No. 62/104,975, filed 19 Jan. 2015, the disclosure of each of which is incorporated herein in their entirety by reference.

TECHNICAL FIELD

The present patent application relates generally to hydraulic devices, and more particularly, to hydrostatic devices that can operate as torque couplings and related systems.

BACKGROUND

Rotary couplings are utilized in vehicles, industrial machines, and marine applications to transmit rotating mechanical power. For example, they have been used in automobile transmissions as an alternative to a mechanical clutch. Use of rotary couplings is also widespread in applications where variable speed operation and controlled start-up without shock loading of the power transmission system is desired.

OVERVIEW

Various systems and methods are disclosed that can utilize a plurality of hydraulic devices each configured to be operable as a hydrostatic coupling and as a vane pump. The plurality of hydraulic devices can allow these systems to operate in various operation modes including hybrid modes that enable simultaneous vehicle drive and hydraulically driven operation (e.g. operation of a bucket while driving the vehicle forward). In further examples, the plurality of hydraulic devices can be used with other vehicle accessories such that the vehicle can operate in a plurality of operation modes including tandem torque amplifying wheel drive mode, a tandem steady state wheel drive mode, a tandem vane pumping mode, a regenerative energy storage mode, and a regenerative energy application mode. In some cases, the accessories used with the vehicle systems can comprise a hydraulic pump motor, an accumulator, and various vehicle auxiliary systems that are hydraulically operated. Additional examples contemplate that the fluid communicating interior portions of the system including, for example, the plurality of hydraulic devices, the plurality of accessories, and the transmission can be coated in a diamond or diamond-like carbon. This can allow more environmentally friendly hydraulic fluids such as glycol to be used by the system.

As used herein the term "vehicle" means virtually all types of vehicles such as earth moving equipment (e.g., wheel loaders, mini-loaders, backhoes, dump trucks, crane trucks, transit mixers, etc.), waste recovery vehicles, marine vehicles, industrial equipment (e.g., agricultural equipment), personal vehicles, public transportation vehicles, and commercial road vehicles (e.g., heavy road trucks, semi-trucks, etc.).

The present inventors have recognized that traditional torque converters slip when subjected to high torque and low or no travel speed, such as when a backhoe drives forward and uses its bucket to break into a heap of material. Slippage can waste energy, lowering efficiency and creating high heat. Traditional hydrostatic drives are designed to provide a minimum displacement when operating as a pump and a maximum displacement when operating as a motor. Again, such operation characteristics can have very low efficiency. In view of these concerns, the present inventors have recognized various vehicle systems that can increase efficiency. In particular, the present inventors have recognized vehicle systems that can use excess energy for hydraulic function and/or to store energy for later use/power regeneration. The efficiency increases provided by the systems can allow lower power rated engines to be used. By controlling the torque requirement of the engine, the engine management system can have a far better chance of offering fuel efficiency and can reduce fuel usage and emissions. The present inventors have also recognized that the use of a plurality of hydraulic devices, each separately capable of operation as a vane pump or torque coupling, allows for tandem system operation such as hybrid pumping and drive that can increase efficiency, reduced fuel usage, and emissions.

To further illustrate the systems and/or methods disclosed herein, the following non-limiting examples are provided:

In Example 1, a vehicle system can include at least one input shaft, at least one output shaft, a plurality of hydraulic devices, and one or more accessories. The plurality of hydraulic devices can be configured to be operable as vane pumps in a first mode of operation and can be configured to be operable as a hydraulic couplings to couple the at least one input shaft with the at least one output shaft in a second operation. The plurality of hydraulic devices can be simultaneously operable as the hydraulic couplings and the vane pumps. The one or more accessories can be in fluid communication with the plurality of hydraulic devices and can be configured to receive a hydraulic fluid pumped from one or more the plurality of hydraulic devices when operating as the vane pumps.

In Example 2, the vehicle system of Example 1, wherein the one or more accessories can include one or more of a hydraulic pump motor, an accumulator, and one or more auxiliary systems.

In Example 3, the vehicle system of Example 2, wherein the hydraulic pump motor can be coupled to the at least one output shaft, the hydraulic pump motor can include a pump motor inlet in fluid communication with the plurality of hydraulic couplings, the pump motor can be configured to receive fluid from one or more of the hydraulic couplings or another of the one or more of accessories to propel the output shaft.

In Example 4, the vehicle system of any one or any combination of Examples 1 to 3, wherein a fluid communicating interior portion of at least one of the plurality of hydraulic devices and one or more accessories can be coated in a diamond or diamond-like carbon.

In Example 5, the vehicle system of Example 4, wherein the fluid communicating interior portion can include a roller bearing of each of the plurality of hydraulic devices and wherein the hydraulic fluid can comprise glycol.

In Example 6, the vehicle system any one or any combination of Examples 1 to 5, can further comprise a controller operable to control a system operation mode based on a plurality of vehicle operation parameters.

In Example 7, the vehicle system of Example 6, wherein the system operation mode can include operating each of the plurality of hydraulic devices independently such that at least one of the hydraulic devices operates as the hydraulic coupling and at least one of the hydraulic devices operates as the vane pump at a same time.

In Example 8, the vehicle system of Example 6, wherein the system operation mode can include operating the plurality of hydraulic devices together as either the hydraulic coupling or the vane pump at a same time.

In Example 9, the vehicle system of Example 6, wherein the system operation mode can comprise controlling the plurality of hydraulic devices and the one or more accessories in one or more of a tandem torque amplifying wheel drive mode, a tandem steady state wheel drive mode, a tandem vane pumping mode, a regenerative energy storage mode, a regenerative energy application mode, and a tandem wheel drive and vane pumping mode.

In Example 10, the vehicle system of any one or any combination of Examples 1 to 9 wherein the plurality of hydraulic devices can be arranged in series.

In Example 11, the vehicle system of any one or any combination of Examples 1 to 9, wherein the hydraulic devices can be arranged in parallel and the at least one output shaft can comprise a plurality of output shafts and the system can further comprise: an output gear assembly, each output gear of the assembly coupled to one of the plurality of output shafts; and a clutch and brake assembly disposed between each of the plurality of hydraulic devices and each output gear, each clutch and brake assembly is configured to isolate an associated output gear from an associated hydraulic device to allow the associated hydraulic device to operate as one of the vane pumps.

In Example 12, a method can include providing a plurality of hydraulic devices for a vehicle, each hydraulic device configured to be operable as a hydraulic coupling and a vane pump, and controlling the plurality of hydraulic devices to operate in together as either the hydraulic coupling or vane pump or controlling each of the hydraulic devices to operate independently such that at least one of the hydraulic devices operates as the hydraulic coupling and at least one of the hydraulic devices operates as the vane pump based on a plurality of vehicle operation parameters.

In Example 13, the method of Examples 12, can comprise pumping a hydraulic fluid from the plurality of hydraulic devices to one or more accessories.

In Example 14, the method of Example 13, can comprise controlling the plurality of hydraulic devices and one or more accessories for operation in a plurality of operation modes the operation modes including two or more of a tandem torque amplifying wheel drive mode, a tandem steady state wheel drive mode, a tandem vane pumping mode, a regenerative energy storage mode, a regenerative energy application mode, and a tandem wheel drive and vane pumping mode.

In Example 15, a vehicle system can include a torque producer coupled to at least one input shaft, a transmission coupled to at least one output shaft, a plurality of hydraulic devices, and a plurality of accessories. The plurality of hydraulic devices can be disposed between the torque producer and the transmission. The plurality of hydraulic devices can be configured to be operable as vane pumps in a first mode of operation and can be configured to be operable as a hydraulic couplings to couple the at least one input shaft with the at least one output shaft in a second mode of operation. The plurality of hydraulic devices can be configured for tandem operation in a plurality of system operation modes. The plurality of accessories can be in fluid communication with the plurality of hydraulic devices and can be configured to receive a hydraulic fluid pumped from one or more the plurality of hydraulic devices when operating as the vane pumps. The plurality of accessories can be configured for operation with the hydraulic devices in the plurality of operation modes.

In Example 16, the vehicle system of Example 15, wherein the plurality of system operation modes for the hydraulic devices and the plurality of accessories can include one or more of a tandem torque amplifying wheel drive mode, a tandem steady state wheel drive mode, a tandem vane pumping mode, a regenerative energy storage mode, a regenerative energy application mode, and a tandem wheel drive and vane pumping mode.

In Example 17, the vehicle system of any one or any combination of Examples 15 to 16, wherein a fluid communicating interior portion of at least one of the plurality of hydraulic devices, the plurality of accessories, and the transmission can be coated in a diamond or diamond-like carbon.

In Example 18, the vehicle system of Example 17, wherein the fluid communicating interior portion can include a roller bearing of each of the plurality of hydraulic devices and an inner face of a gear ring of the transmission and wherein the hydraulic fluid comprises glycol.

In Example 19, the vehicle system of any one or any combination of Examples 15 to 18, wherein tandem operation in the plurality of system operation modes can include operating each of the plurality of hydraulic devices independently such that at least one of the hydraulic devices operates as the hydraulic coupling and at least one of the hydraulic devices operates as the vane pump at a same time.

In Example 20, the vehicle system of any of Examples 15 to 18, wherein tandem operation in the plurality of system operation modes can include operating the plurality of hydraulic devices in together as either the hydraulic coupling or the vane pump at a same time.

In Example 21, the vehicle system of any one or any combination of Examples 15 to 20, wherein the plurality of hydraulic devices can be arranged in series.

In Example 22, the vehicle system of any one or any combination of Examples 15 to 20, wherein the hydraulic devices can be arranged in parallel and the at least one output shaft can comprise a plurality of output shafts and the system can further comprise: an output gear assembly, each output gear of the assembly coupled to one of the at least one output shafts; and a clutch and brake assembly disposed between each of the plurality of hydraulic devices and each output gear, each clutch and brake assembly is configured to isolate an associated output gear from an associated hydraulic device to allow the associated hydraulic device to operate as one of the vane pumps.

In Example 23, the systems and/or methods of any one or any combination of Examples 1-22 can optionally be configured such that all elements or options recited are available to use or select from.

These and other examples and features of the present devices, systems, and methods will be set forth in part in the following Detailed Description. This overview is intended to provide a summary of subject matter of the present patent application. It is not intended to provide an exclusive or exhaustive removal of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present application relates to vehicle systems that can utilize a plurality of hydraulic devices each configured to be operable as a hydraulic coupling and as a vane pump. According to one example, the system can include at least one input shaft, at least one output shaft, a plurality of hydraulic devices, and one or more accessories. The plurality of hydraulic devices can be configured to be operable as vane pumps in a first mode of operation and can be configured to be operable as a hydraulic couplings to couple the at least one input shaft with the at least one output shaft in a second mode of operation. The plurality of hydraulic devices can be simultaneously operable as the hydraulic couplings and the vane pumps. The one or more accessories can be in fluid communication with the plurality of hydraulic devices and can be configured to receive a hydraulic fluid pumped from one or more the plurality of hydraulic devices when operating as the vane pumps. According to further examples, a torque producer can be coupled to at least one input shaft and a transmission can be coupled to at least one output shaft. Further examples can include the one or more accessories comprise a plurality of accessories that are configured for operation with the hydraulic devices in the plurality of operation modes.

According to another example, a method is disclosed that can include providing a plurality of hydraulic devices for a vehicle, each hydraulic device configured to be operable as a hydraulic coupling and a vane pump, and controlling the plurality of hydraulic devices to operate in together as either the hydraulic coupling or vane pump or controlling each of the hydraulic devices to operate independently such that at least one of the hydraulic devices operates as the hydraulic coupling and at least one of the hydraulic devices operates as the vane pump based on a plurality of vehicle operation parameters.

Other examples not specifically discussed herein with reference to the FIGURES can be utilized. The disclosed vehicle systems are applicable to various types of vehicles such as earth moving equipment (e.g., wheel loaders, miniloaders, backhoes, dump trucks, crane trucks, transit mixers, etc.), waste recovery vehicles, marine vehicles, industrial equipment (e.g., agricultural equipment), personal vehicles, public transportation vehicles, and commercial road vehicles (e.g., heavy road trucks, semi-trucks, etc.).

Figure 1:
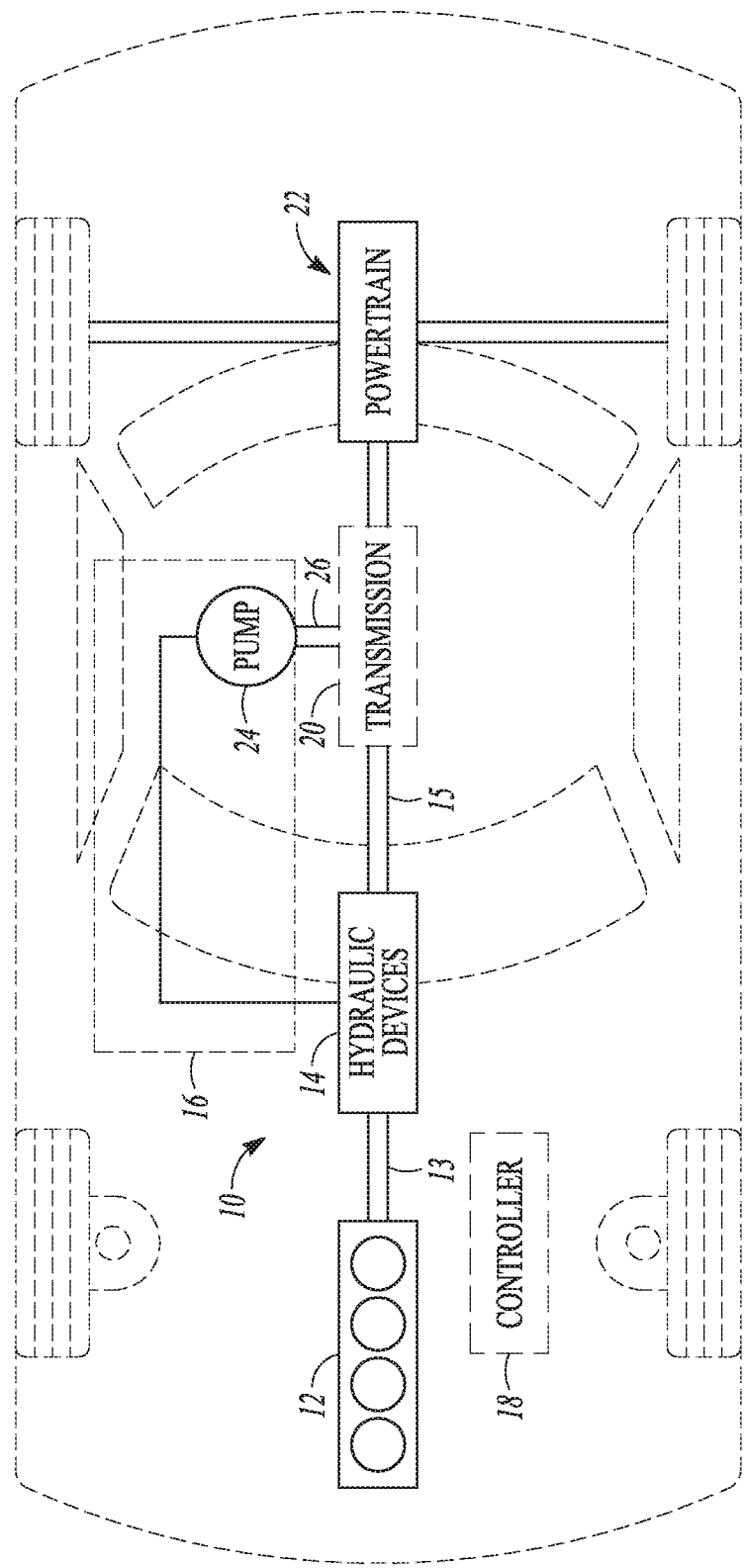
FIG. 1 is schematic view of a vehicle including a vehicle system having a plurality of hydraulic devices, according to an example of the present application.

FIG. 1 shows a highly schematic view of a system 10 aboard a vehicle. As will be discussed subsequently, the system 10 can include a torque source 12, an input shaft 13, a plurality of hydraulic devices 14, an output shaft 15, a plurality of accessories 16, a controller 18, a transmission 20, and a power train 22. The plurality of accessories 16 can include a pump motor 24 and one or more output shafts 26.

The illustration of FIG. 1 represents one possible configuration (e.g., with the plurality of hydraulic devices 14 disposed before the transmission 20 and with output shafts 15 (including shaft 26) coupled to the transmission 20), with other configurations possible. The torque source 12 can comprise any source including, but not limited to, an engine, a flywheel an electric motor, etc. The torque source 12 is coupled to one or more input shafts 13 for the plurality of hydraulic devices 14. The torque source 12 outputs torque/power to the plurality of hydraulic devices 14, which can selectively transmit the torque/power via the one or more output shafts 15 to the transmission 20 or another power train 22 system. Although not illustrated in FIG. 1, the hydraulic devices 14 can be intelligently controlled by pilot signal(s), valve(s), etc. to selectively transmit power/torque or utilize the power/torque for pumping a hydraulic fluid to the plurality of vehicle accessories 16. The controller 18 (e.g. vehicle ECU) can be configured to communicate with various systems and components of the system 10 and vehicle and can be operable to control a system operation mode (as illustrated and discussed in reference to FIGS. 4-8) based on a plurality of vehicle operation parameters (e.g. deceleration, acceleration, vehicle speed, desire or need to operate various auxiliary systems including hydraulically powered systems, etc.).

As will be discussed in further detail subsequently, the plurality of hydraulic devices 14 can each be configured to be operable as a hydraulic coupling and as a vane pump and can be controlled to operate in a manner that provides for coupling only, coupling and vane pumping, pumping only, etc. Accordingly, each of the plurality of hydraulic devices 14 are coupled to the input shaft 13 and the output shaft 15. Additionally, FIG. 1 illustrates an example where the plurality of hydraulic devices 14 are in fluid communication with the plurality of accessories 16. FIG. 1 illustrates one of the accessories 16, the pump motor 24, which is coupled to the transmission 20 by the output shaft 26. According to additional examples, the plurality of accessories 16 can comprise, for example, an accumulator, and/or one or more auxiliary systems (e.g., systems for cooling fan drives, dump boxes, power steering, compressor systems, alternator systems, braking systems, fire suppression systems, hydraulic equipment related systems, etc.).

In one example, the pump motor 24 can comprise a digitally controlled piston pump. The pump motor 24 can be controlled by various methods including, but not limited to, electronically, pressure compensated, lever, or digitally. The pump motor 24 is coupled to the transmission 20 by the output shaft 26 (part of shaft 15) and can receive torque from or apply torque to the transmission 20. According to one example, the hydraulic pump motor 24 can include a port in fluid communication with the discharge pressure of one or more of the hydraulic devices 14. According to one mode of system operation, the pump motor 24 can receive hydraulic fluid at the discharge pressure from one or more of the hydraulic devices 14 to propel the transmission 20. The pump motor 24 can be stroked on slightly or fully in this condition; the degree of stroke is inconsequential as there can be little inlet port pressure. Further details regarding additional operation of the pump motor 24 and system operation modes will be discussed subsequently.

According to one example, each of the plurality of hydraulic devices 14 can comprise a hydrostatic torque converter/vane pump as described in U.S. application Ser. No. 13/510,643, Publication No. 20130067899A1, the entire specification of which is incorporated herein by reference in its entirety. The operation and construction of the hydraulic device as a vane pump is further described in international application no. PCT/AU2007/000772, publication no. WO/2007/140514, entitled, "Vane Pump for Pumping Hydraulic Fluid," filed Jun. 1, 2007; international application no. PCT/AU2006/000623, publication no. WO/2006/119574, entitled, "Improved Vane Pump," filed May 12, 2006; and international application no. PCT/AU2004/0951, publication no. WO/2005/005782, entitled, "A Hydraulic Machine," filed Jul. 15, 2004, the entire specification of each of which is incorporated herein by reference in their entirety.

In general, each of the plurality of hydraulic devices 14 can have a body and at least a first vane configured for movement relative to the body. Each hydraulic device can be adapted to retain the first vane in a retracted vane mode of operation and to release the first vane in a vane extended mode of operation in which the first vane extends to meet the body to hydraulically work fluid when the first vane is moved with respect to the body. The input shaft 13 and the output shaft 15 can coupled to rotate together in the vane extended mode of operation (i.e. the hydraulic devices operate as hydraulic couplings) if the output shaft 15 is not fixed or has sufficient resistance to couple. In other operation modes, such as a first operation mode, the input shaft 13 and output shaft 15 can be free to rotate with respect to one another in a vane extended mode of operation (i.e. the hydraulic devices operate as vane pumps) if the output shaft 15 is either fixed or has does not create sufficient resistance to entirely couple.

According to the example of in FIG. 1, one or more of the hydraulic devices 14 can operate as a hydraulic pump, and thus, operates as part of a hydraulic system for the vehicle. Various intelligent controls (electronic, pressure compensated, lever, and/or digital) of valves, bleed valves, components, etc. can be utilized to control the direction and amount of hydraulic fluid to and from the plurality of accessories 16 and the plurality of hydraulic devices 14. The present systems benefit from precise control. For example, programmable torque settings affected by adjustment of the pressure relief setting result in predetermined stall points. Such programmable stall points can be either fixed or remotely set by associating relief valve setting with a remote conventional override relief valve. A further benefit of precise control can be controlled acceleration or deceleration by varying relief valve settings to match desired maximum torques. In such embodiments, start and stop torques can be reduced to limit high peak torque levels that can damage machinery.

According to further examples, the controller 18 can operate as a remote pressure control. In some examples, the remote pressure control is coupled to one side of a balance piston, with pump output in fluid communication with the opposite side of the balance piston. The balance piston is to control whether the hydraulic device can pump hydraulic fluid. For example, if the remote pressure control is set to a pressure, the balance piston allows coupling discharge pressure to rise until the device discharge pressure is higher than the pressure, moving the balance piston to overcome the remote pressure control pressure. As the balance piston moves, it enables the device discharge to drain, such as to tank. In such a manner, the maximum torque transmitted is remotely controllable via the remote pressure control signal. In some examples, the remote pressure control is used in addition to a primary relief valve that allows hydraulic fluid to pump in any case where a torque differential between the input shaft 13 and the output shaft 15 exceeds a predetermined threshold.

Figure 2:
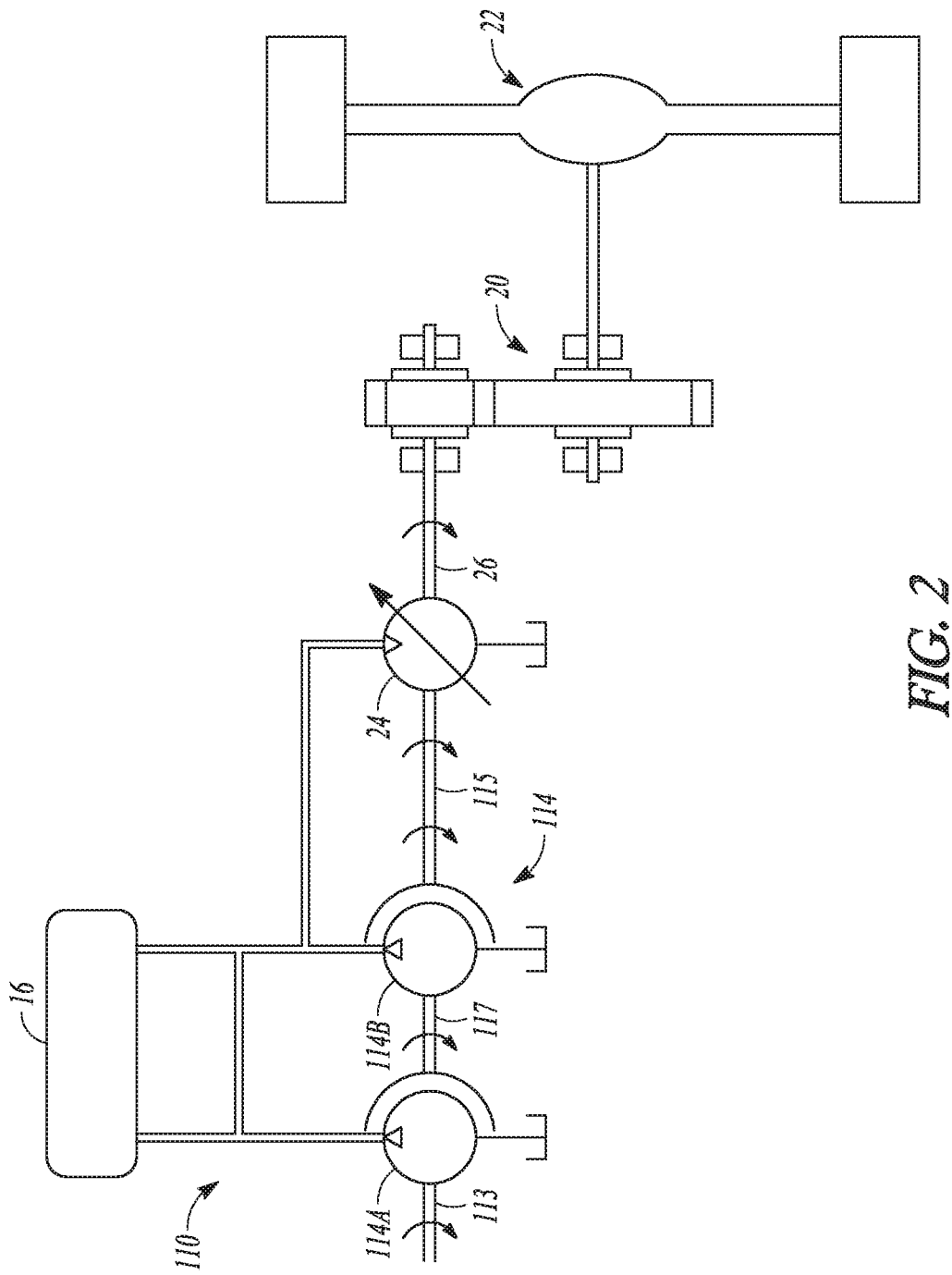
FIG. 2 is a schematic view of a vehicle system that includes the plurality of hydraulic devices arranged in series, according to an example of the present application.

FIG. 2 illustrates a system 110 similar in construction and arrangement to that of previously discussed system 10 (FIG. 1) but with a plurality of hydraulic devices 114 arranged in series. In particular, the system 110 can include an input shaft 113, a plurality of hydraulic devices 114, an output shaft 115, an intermediate shaft 117, the plurality of accessories 16, the transmission 20, and the power train 22. The plurality of accessories 16 can include the pump motor 24 and the output shaft 26 as previously discussed.

The operation and construction of many of the components of the system 110 have been discussed previously with respect to the system 10 (FIG. 1), and therefore, will not be discussed in great detail. The input shaft 113 can be coupled to a torque source (not shown) and connected to a first hydraulic device 114a. The intermediate shaft 117 can couple the first hydraulic device 114a to at least a second hydraulic device 114b of the plurality of hydraulic devices 114. The output shaft 115 from the plurality of hydraulic devices 114 can be coupled to the transmission 20 and the remainder of the power train 22. Although described in reference to two hydraulic devices 114a and 114b in the example of FIG. 2, it should be noted in other examples three or more hydraulic devices can be utilized with the system.

The plurality of hydraulic devices 114 can be in fluid communication with the plurality of accessories 16 as previously discussed. One of the accessories 16 can comprise the pump motor 24 with the output shaft 26 (part of output shaft 115) coupled to the transmission 20 as discussed previously. Although the example of FIG. 2 illustrates the pump motor 24 as coupled to the output shaft 115, in other examples the pump motor 24 and output shaft 26 can be coupled to the transmission 20 without being coupled to the output shaft 115.

In the example of FIG. 2, the first hydraulic device 114a is illustrated as coupled to the second hydraulic device 114b by the intermediate shaft 117. However, in other examples a clutch or similar device can be used to disconnect and isolate the first hydraulic device 114a from the second hydraulic device 114b (or subsequent additional devices) such that one or more of the plurality of hydraulic devices 114 can be utilized as the vane pump while one or more of the plurality of hydraulic devices 114 can be utilized as the torque coupling.

Figure 2A:
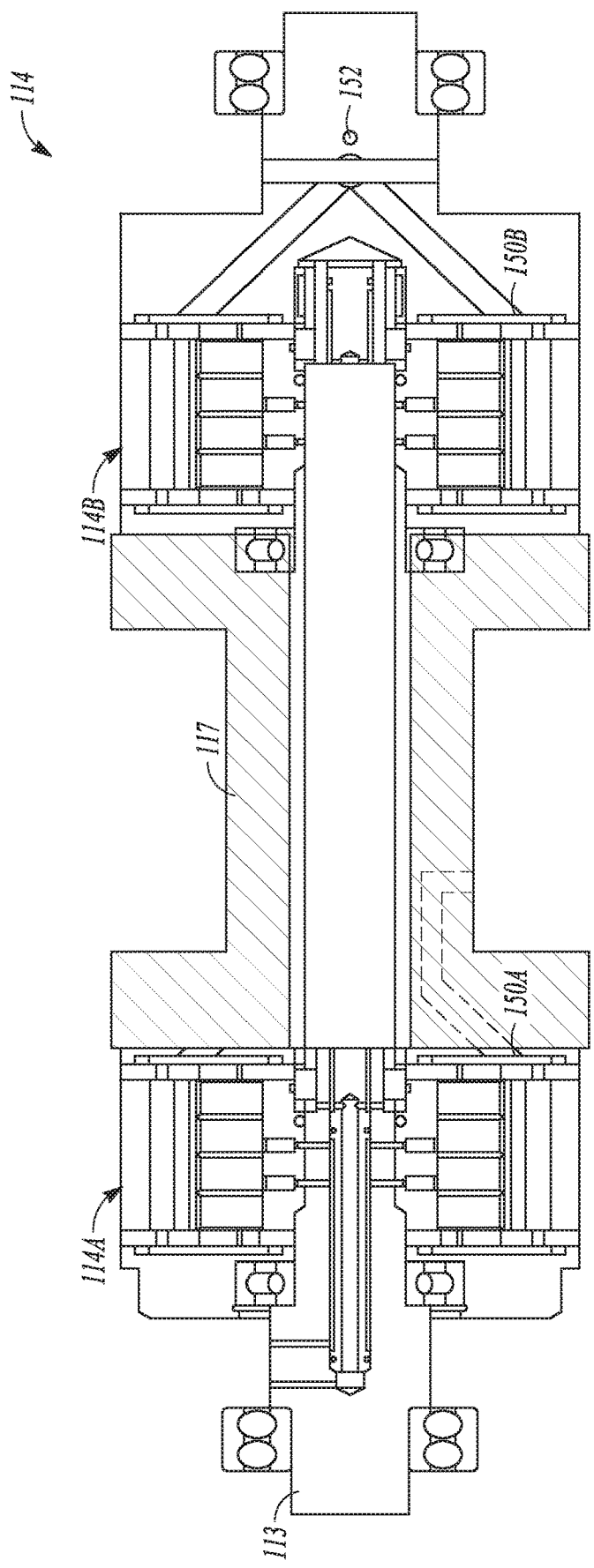
FIG. 2A is a cross-sectional view of the series arrangement of the plurality of hydraulic devices, according to an example of the present application.

FIG. 2A illustrates a cross-section of the plurality of hydraulic devices 114 according to one example. According to the example of FIG. 2A, the intermediate shaft 117 can comprise a bell housing connecting the first hydraulic device 114a to the second hydraulic device 114b. The input shaft 113 can comprise a thru shaft that drives both the first hydraulic device 114a and the second hydraulic device 114b. In FIG. 2A, the first hydraulic device 114a and the second hydraulic device 114b include pump supply ports 150a and 150b, which allow for hydraulic fluid to be supplied for torque amplification and/or other hydraulic functions. As discussed, the plurality of the hydraulic devices 114 can be controlled to work together in unison (e.g., to pump) or can be controlled to work in different manners (e.g., couple and transfer torque and pump). The example of FIG. 2A, also illustrates a port 152 for remote pressure control as discussed with regard to the example of FIG. 1.

In one example, a fluid communicating interior portion of at least one of the plurality of hydraulic devices and/or the plurality of accessories can be coated in a diamond or diamond-like carbon. According to further examples, the fluid communicating interior portion includes a roller bearing of each of the plurality of hydraulic devices and/or and an inner face of a gear ring of the transmission. The diamond or diamond-like carbon coating can comprise a coating as disclosed in U.S. Pat. No. 8,691,063B2, the entire specification of which is incorporated herein by reference. The use of a diamond or diamond-like coating can reduce or prevent corrosion of the steel housing and other steel components that are in fluid communication with the hydraulic fluid. Thus, the diamond or diamond-like carbon coating can allow for the use of environmentally friendly hydraulic fluids such as glycol that may otherwise have been too corrosive.

Figure 3:
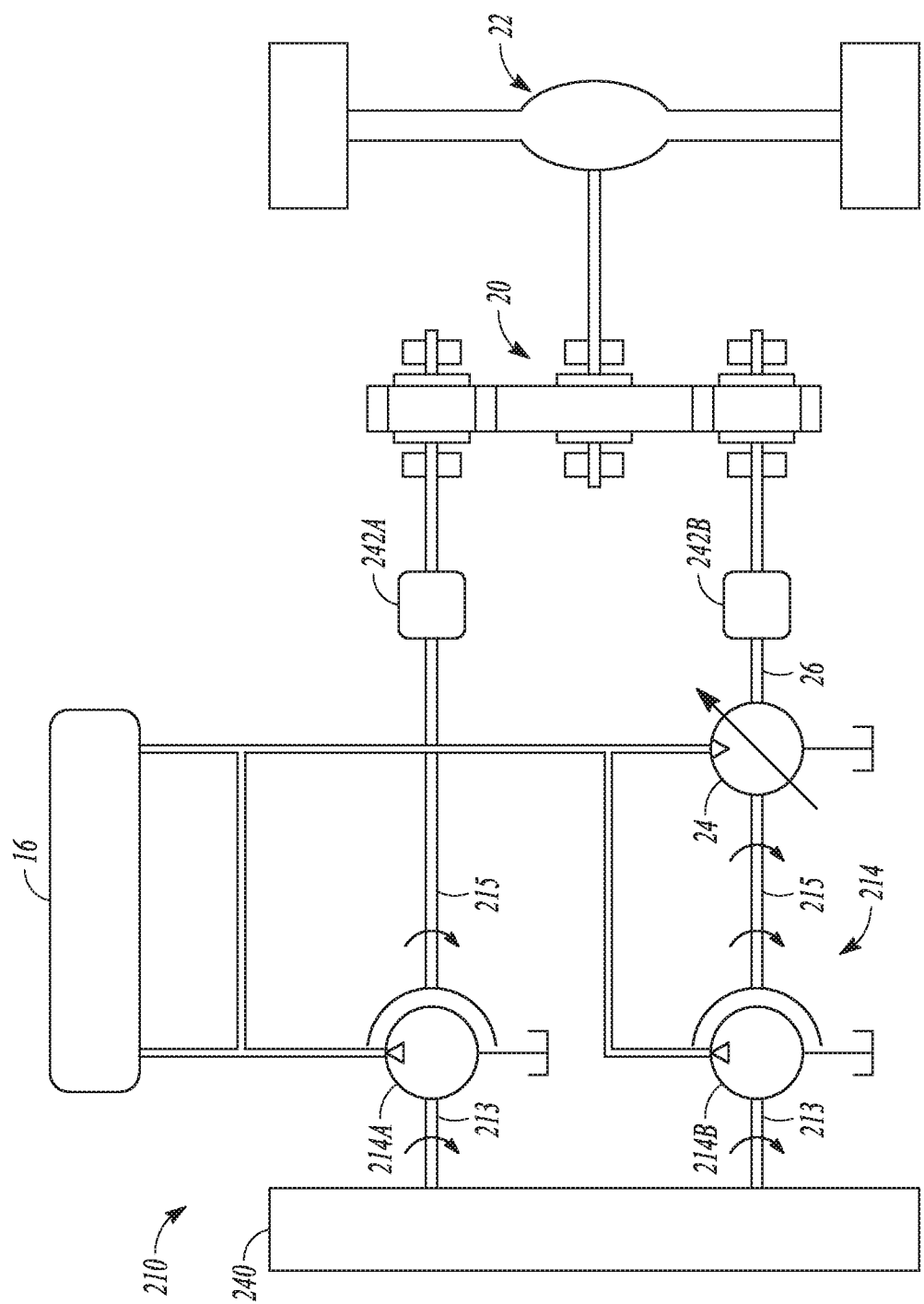
FIG. 3 is a schematic view of a vehicle system that includes the plurality of hydraulic devices arranged in parallel, according to an example of the present application.

FIG. 3 illustrates a system 210 similar in construction to the previously discussed system 10 (FIG. 1) but with the plurality of hydraulic devices 214 arranged in parallel. The system 210 can include input shafts 213, output shafts 215, the plurality of accessories 16, the transmission 20, and the power train 22. The plurality of accessories 16 can include the pump motor 24 and the one or more output shafts 26. The system of FIG. 3 also includes a drive 240 and clutch and brake assemblies 242a and 242b.

The operation and construction of many of the components of the system 210 have been discussed previously with respect to the system 10 (FIG. 1), and therefore, will not be discussed in great detail. Drive 240 can be disposed between the input shafts 213 and the torque source (not shown). According to various examples, the drive 240 can comprise, for example, a planetary gear assembly or a multi-output drive from the engine bell housing.

Each of the input shafts 213 can be coupled to the drive 240 and to one of the plurality of hydraulic devices 214. Each of the output shafts 215 extends from the plurality of hydraulic devices 214 and can be coupled to the transmission 20 and the remainder of the power train 22. Although described in reference to two hydraulic devices 214a and 214b in the example of FIG. 3, it should be noted in other examples three or more hydraulic devices can be utilized with the system.

The hydraulic devices 214 can be in fluid communication with the plurality of accessories 16 as previously discussed and illustrated. One of the accessories 16 can comprise the pump motor 24 and output shaft 26 (part of shaft 215) coupled to the transmission 20 as discussed previously. Although the example of FIG. 3 illustrates the pump motor 24 as coupled to one of the output shaft 215 (and output shaft 26 as comprising output shaft 215), in other examples, multiple pump motors can be utilized, coupled to two or more output shafts. In further examples, the pump motor can be coupled to the transmission 20 without being couple to the output shaft 215.

It should be noted that drive 240 can allow the first hydraulic device 214a to operate at different rates allowing different rates of pumping and/or torque transfer. As illustrated in the example of FIG. 3, one clutch and brake assembly 242a and/or 242b can be coupled to the output shaft 215 and can be controlled to isolate the corresponding one of the plurality of hydraulic devices 214 from torque transfer from the transmission 20. This allows the output shaft 215 to be locked and one or more of the plurality of hydraulic devices 214 to operate as the vane pump as previously discussed to pump hydraulic fluid to the plurality of accessories 16.

Figure 4:
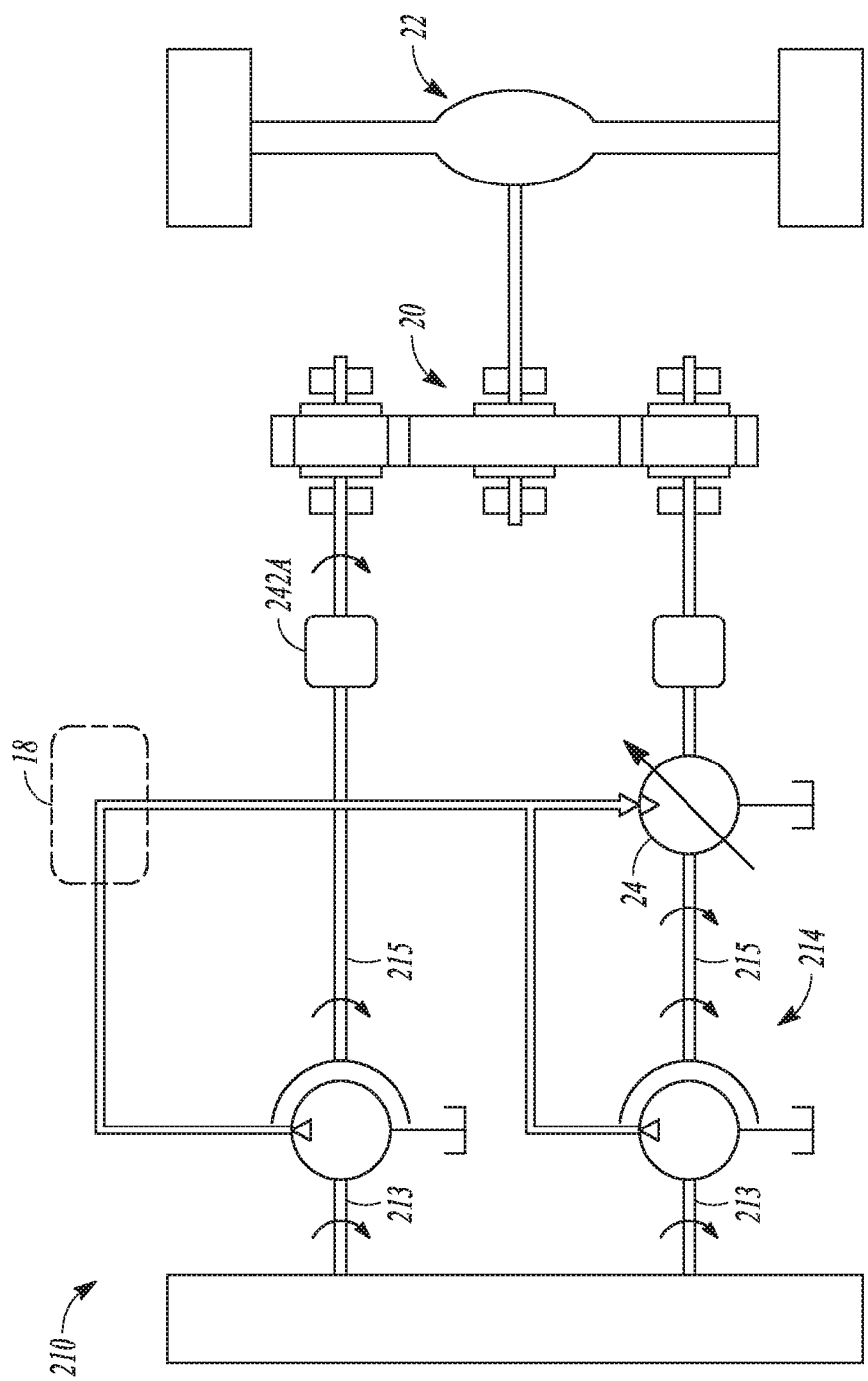
FIG. 4 is a schematic view of the vehicle system operating in a tandem torque amplifying wheel drive mode, according to an example of the present application.

FIG. 4 shows the vehicle system 210 operating in a tandem torque amplifying wheel drive mode. The vehicle system 210 includes the aforementioned components discussed in regards to FIG. 3.

FIG. 4 provides an example where the system operation mode includes operating the plurality of hydraulic devices 214 together as hydraulic couplings at a same time. More particularly, the system 210 includes the pump motor 24, which can be operated as a torque amplifier while in a driving mode of vehicle operation. The illustrated mode of operation correlates to a steady state driving condition. Torque to the input shafts 213 is transmitted to the output shafts 215 with few or no losses by the plurality of hydraulic devices 214 acting as hydraulic couplings. The hydraulic couplings effectively work as mechanical shafts.

To arrive at the steady state of FIG. 4, a number of operations can occur. For example, as a first gear of the transmission 20 is selected, the plurality of hydraulic devices 214 can be controlled by controller 18 such that each device releases working surfaces such as vanes so that each of the hydraulic devices acts as a vane pump to pump against the hydraulic fluid. With the valve is so adjusted, the hydraulic device begins to pump fluid to the pump motor 24. The pump motor 24 receives the hydraulic fluid and strokes on gradually to begin to move the power train 22 (e.g., the wheel box drive assembly). As the vehicle starts to move, more speed is required and the variable motor is controlled to reduce displacement, reducing torque and increasing speed. After the steady state is reached, if a boost of torque is required (e.g. if the pressure generated torque in the coupler does not exceed the required torque for the wheel drive), the controller 18 can control the system to again introduce hydraulic motor torque through the pump motor 24 on top of the torque the engine produces as transferred through the hydraulic devices acting as couplings. Although not illustrated in FIG. 4, one or more of the plurality of hydraulic devices 214 can also direct hydraulic fluid to an accumulator or additional auxiliary systems as desired.

In some examples, after the steady state driving mode is reached, the valves (not shown) or other flow control devices and/or techniques can be used to resist pumping by the plurality of hydraulic devices 214. The plurality of hydraulic devices can essentially lock except for any leakage, and the pump motor 24 strokes off. In this mode, the input shafts 213 are locked to the output shafts 215 and thereby to the transmission 20 and the inefficiencies of the hydraulic system are substantially reduced or eliminated.

It should be noted that using a plurality of hydraulic devices with the disclosed systems can have the following exemplary benefits: 1) greater rates and variability of range of torque transfer, acceleration, deceleration, 2) greater versatility to meet additional operational demands (e.g., if less than all of the plurality of hydraulic devices are needed to operate as the hydraulic coupling at steady state (or prior thereto) one or more of the plurality of hydraulic devices can operate as a vane pump to provide hydraulic fluid to the one or more of the plurality of accessories, 3) greater rates and system versatility of hydraulic fluid pumping to the plurality of accessories. Other benefits of the system can include reducing peak transient forces experienced by the transmission 20, reduced hydraulic noise, greater fuel efficiency, reduced emissions, among other benefits.

Figure 5:
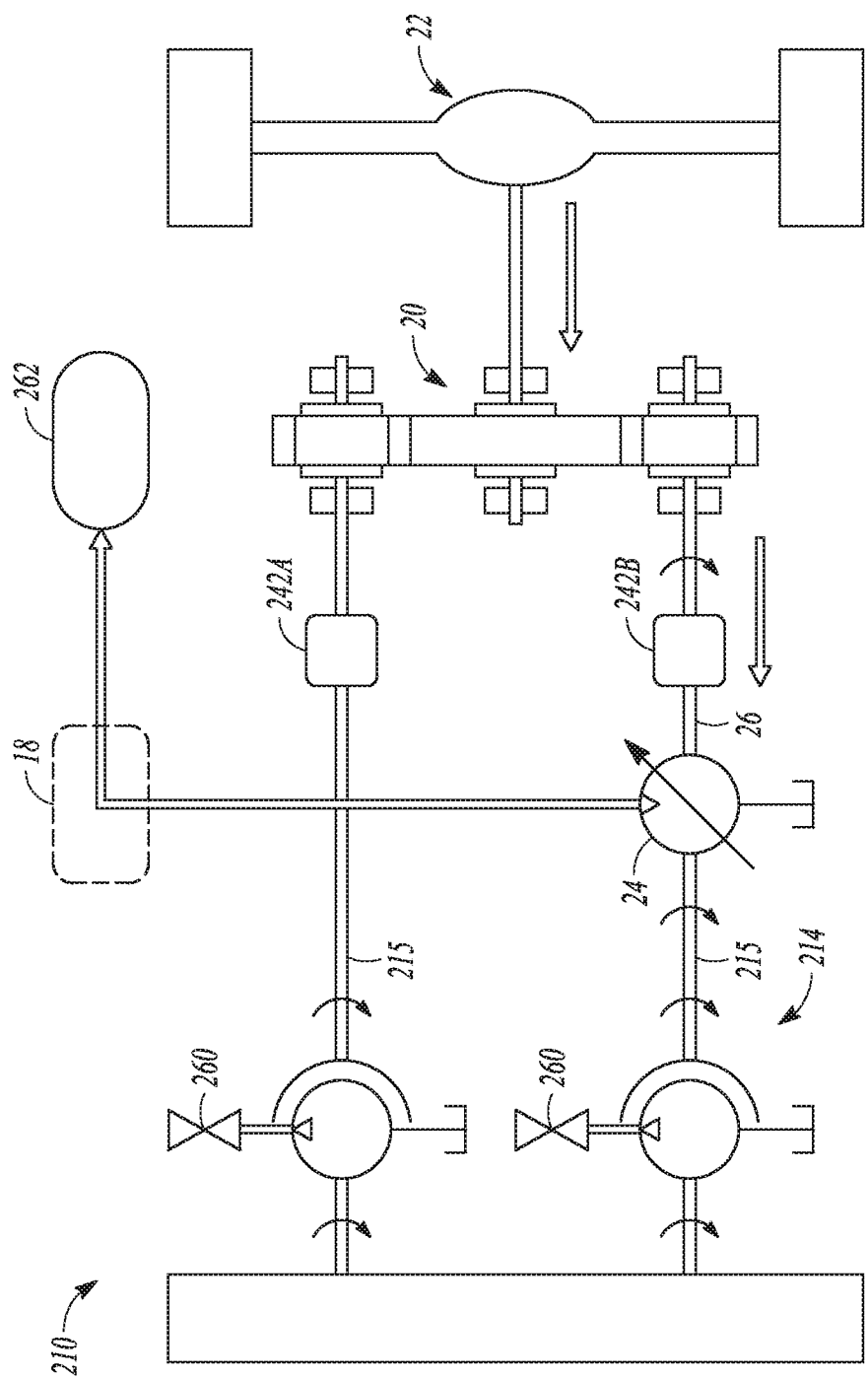
FIG. 5 is a schematic view of the vehicle system operating in a regenerative energy storage mode, according to an example of the present application.

FIG. 5 illustrates the system 210 in a regenerative energy storage mode, which can occur during braking of the vehicle, according to an example. During this mode, the torque source (not shown) can be in a neutral or idle mode of operation. According to the example of FIG. 5, the hydraulic devices 214 can be in a vane pumping mode of operation but with the outlet port of each hydraulic device blocked as illustrated by valves 260. One of the clutch and brake assemblies 242*a* can be engaged while the other (242*b*) is not such that one shaft 215 is isolated. Thus, drive torque (illustrated with arrows) is transferred from the power train 22 through the transmission 20 along the output shaft 26 to the pump motor 24. According to the example of FIG. 5, the controller 18 controls braking effort through pressure set and pump displacement. The pump motor 24 is stroked to a pumping mode to direct fluid pressurized during vehicle deceleration into an accumulator 262. If the accumulator 262 is full, the pump motor 24 can be used to pump fluid to accessories or over a relief valve (not shown). Alternatively, the pump motor 24 can optionally be stroked off of pumping. In various examples, wheel brakes (not shown) can be used to assist in stop. In some additional examples, one or more of the hydraulic devices can be engaged to operate as the hydraulic coupling to allow for engine braking. In brief, the regenerative energy storage mode allows for variable braking effort and storage of kinetic energy that would otherwise be lost as the vehicle decelerates. Torque feedback drives the pump motor 24 offering pressurized flow to a storage system (e.g., the accumulator 262).

Figure 6:
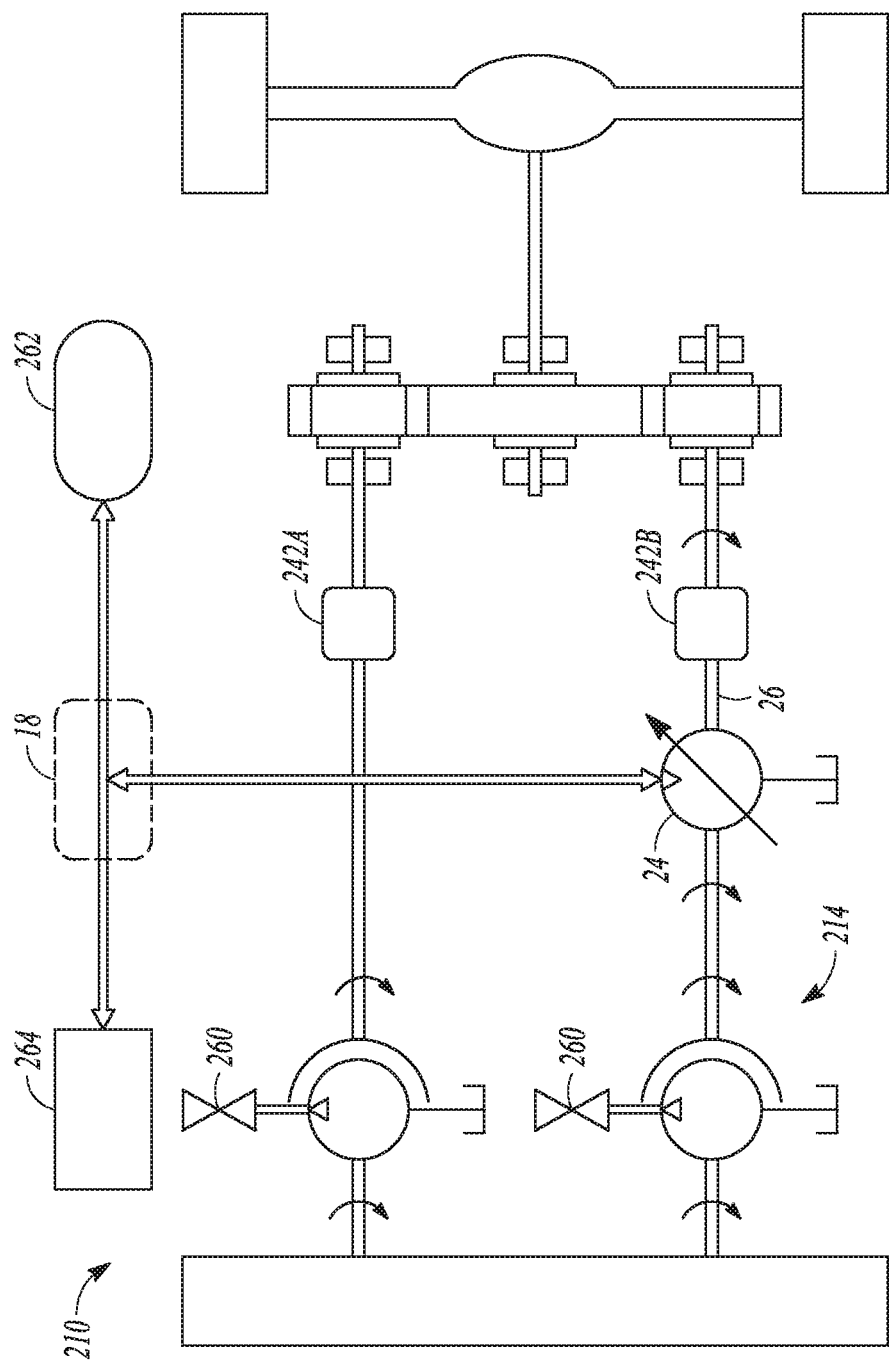
FIG. 6 is a schematic view of the vehicle system operating in regenerative energy application mode, according to an example of the present application.

FIG. 6 illustrates the system 210 in a regenerative energy application mode, which can occur during various other modes and during vehicle idle or neutral. FIG. 6 illustrates various examples of regenerative energy applications. Not all such applications may occur on every vehicle and/or may not occur simultaneously. As with the previous example, the example of FIG. 6 shows the hydraulic devices 214 can be in a vane pumping mode of operation but with the outlet port of each hydraulic device blocked as illustrated by valves 260. One of the clutch and brake assemblies 242*a* can be engaged while the other (242*b*) need not be engaged. In the illustrated example, energy stored in the accumulator 262, such as energy stored during deceleration of the vehicle, is used to accelerate the vehicle. The controller 18 can signal one or more flow control devices (not shown) to be opened and the pump motor 24 stroked to a motor mode to propel the vehicle via drive torque application through output shaft 26. According to some examples, the plurality of hydraulic devices can pump fluid until the resistance from the fluid reaches a magnitude to substantially cause the hydraulic devices 214 to act as locked hydraulic couples. The fluid can reach such a pressure through control and adjustment of one or more valves (not shown). The fluid can additionally reach such a pressure when the pump motor 24 experiences a high resistance to propulsion.

According to the illustrated embodiment, the controller 18 can additionally control flow from the accumulator 262 to additional auxiliary hydraulic systems 264 including any vehicle hydraulic system that requires less pressure than that of the hydraulic fluid from the accumulator 262. In brief, the regenerative energy application mode can allow for power transfer to the wheel drives when sufficient pressure and flow is available to maintain travel speed or for additional power if desired. The regenerative energy application mode can also be used for various hydraulic functions.

Figure 7:
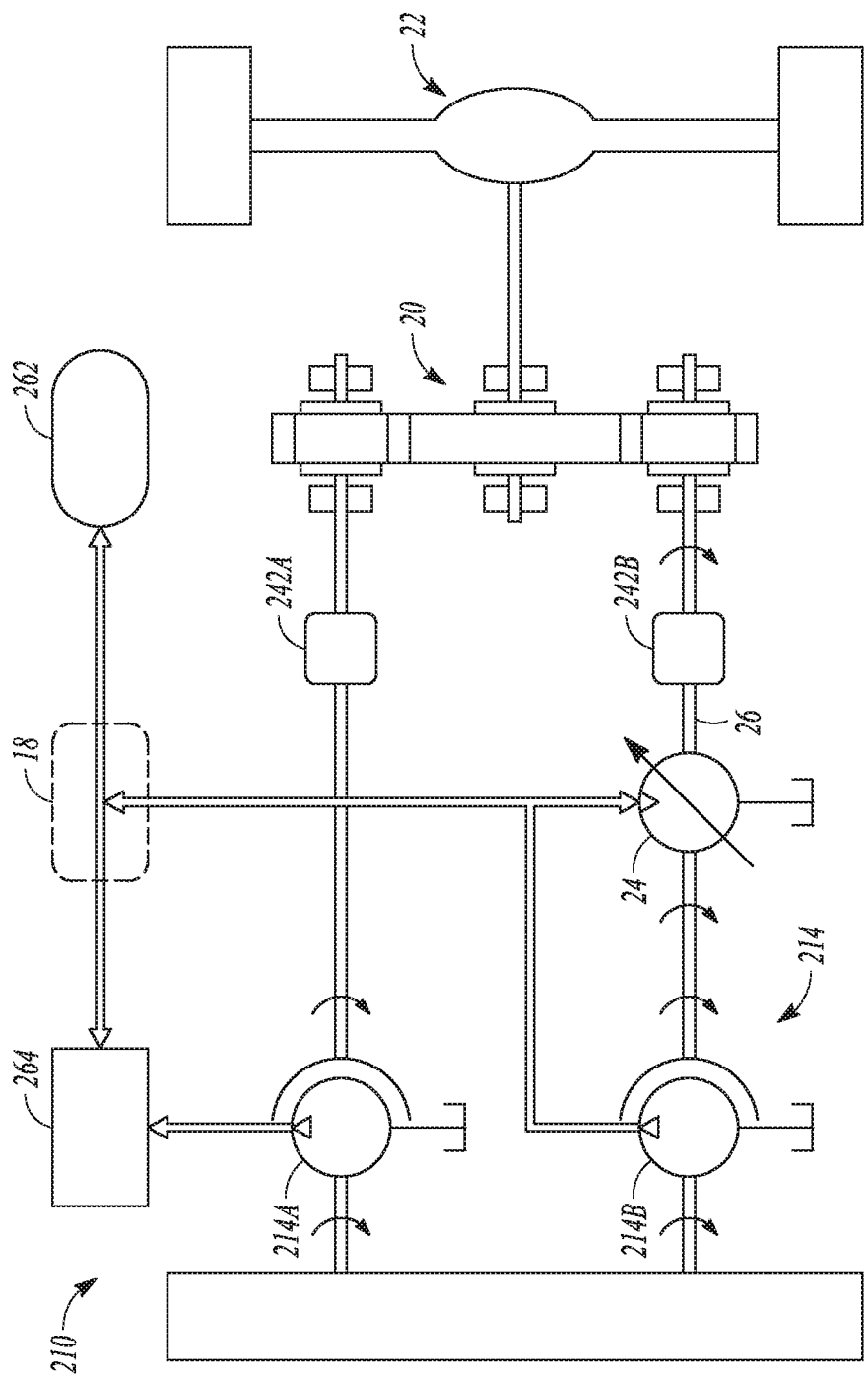
FIG. 7 is a schematic view of the vehicle system operating in tandem wheel drive and vane pumping mode, according to an example of the present application.

FIG. 7 shows the system 210 operating in a tandem wheel drive and vane pumping mode, according to an example. Such a mode of operation can occur, for example, when a backhoe drives forward and uses its bucket to break into a heap of material. The tandem wheel drive and vane pumping mode comprises a hybrid system operation mode that includes operating each of the plurality of hydraulic devices 214*a* and 214*b* independently such that at least one of the hydraulic devices operates as the hydraulic coupling and at least one of the hydraulic devices operates as the vane pump at a same time. According to the illustrated example, one of the clutch and brake assemblies 242*a* can be engaged while the other (242*b*) need not be engaged allowing torque to be transferred by the coupling and/or pump motor 24 to the transmission 20. The number of hydraulic devices assigned to each function (drive or pumping) and operation of the pump motor 24 (operation as a pump or motor) is controlled by the controller 18 and can be varied as desired. In particular, the controller 18 can control the pressure in the plurality of hydraulic devices 214 and the pump motor 24 to produced desired torque to the power train 22 for drive, as well as use of the flow for other hydraulic functions (e.g., use of a bucket). Additionally, the controller 18 can control excess energy such that it is stored in the accumulator 262 and/or used in the auxiliary systems 264. In brief, the hybrid functionality of the plurality of hydraulic devices 214 (drive and fluid power) offers improved system versatility. The plurality of hydraulic devices 214 can maintain maximum torque for tractive effort with little to no waste of power through slippage as would be experienced with a traditional torque converter. The controller 18 can ensure the torque requirements of the power train wheel drives are met and that other hydraulic operations (e.g., lift) are achieved.

Figure 8:
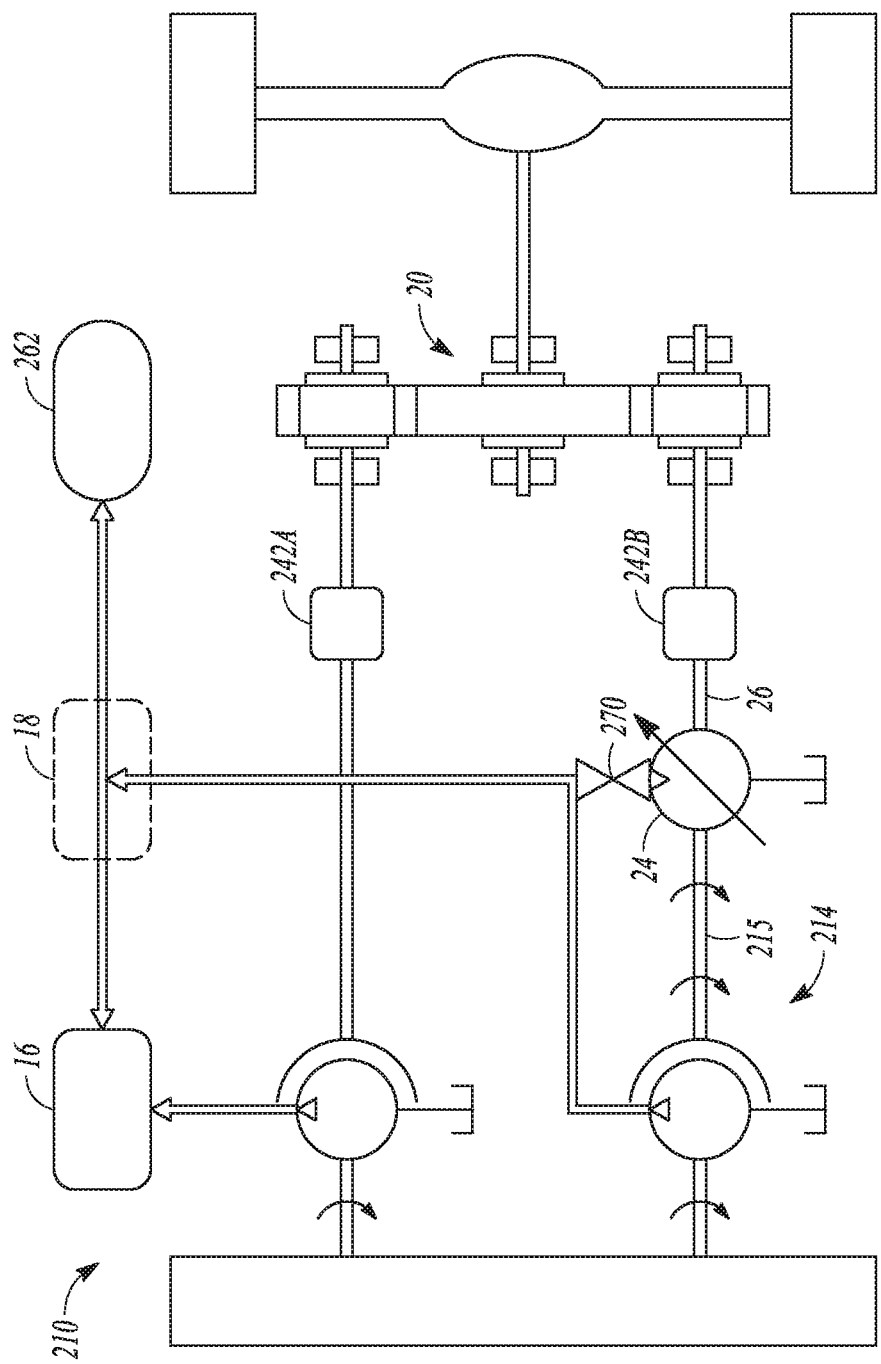
FIG. 8 is a schematic view of the vehicle system operating in tandem vane pumping mode, according to an example of the present application.

FIG. 8 shows the system 210 operating in a tandem vane pumping mode, according to an example. Such mode can occur when the vehicle is at rest (idle or neutral position), for example. The pump motor 24 can be isolated (not stroked on) as illustrated by valve 270 and need not be used. According the illustrated example, all clutch and brake assemblies 242*a* and 242*b* can be controlled to isolate the plurality of hydraulic devices 214 from the transmission 20. This allows the output shaft 215 (including the output shaft 26) to be locked and the plurality of hydraulic devices 214 to operate as the vane pumps as previously discussed to pump hydraulic fluid to the plurality of accessories 16. The controller 18 can control which of the plurality of hydraulic devices 214 are in operation and which accessories 16 receive the hydraulic fluid. According to the illustrated example, additional pressurized hydraulic fluid can be stored in the accumulator 262 for later use.

Although specific configurations of the systems shown in FIGS. 1-8 and particularly described above, other system designs that fall within the scope of the claims are anticipated. For example, the systems discussed could be combined or operated in slightly different manners than as illustrated.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A vehicle system comprising:
at least one input shaft;
at least one output shaft;
a plurality of hydraulic devices configured to be operable as vane pumps in a first mode of operation and configured to be operable as a hydraulic couplings to couple the at least one input shaft with the at least one output shaft in a second operation, wherein the plurality of hydraulic devices are simultaneously operable as the hydraulic couplings and the vane pumps; and
one or more accessories in fluid communication with the plurality of hydraulic devices and configured to receive a hydraulic fluid pumped from one or more the plurality of hydraulic devices when operating as the vane pumps.

2. The vehicle system of claim 1, wherein the one or more accessories include one or more of a hydraulic pump motor, an accumulator, and one or more auxiliary systems.

3. The vehicle system of claim 2, wherein the hydraulic pump motor is coupled to the at least one output shaft, the hydraulic pump motor including a pump motor inlet in fluid communication with the plurality of hydraulic couplings, the pump motor configured to receive fluid from one or more of the hydraulic couplings or another of the one or more of accessories to propel the output shaft.

4. The vehicle system of claim 1, wherein a fluid communicating interior portion of at least one of the plurality of hydraulic devices and one or more accessories are coated in a diamond or diamond-like carbon.

5. The vehicle system of claim 4, wherein the fluid communicating interior portion includes a roller bearing of each of the plurality of hydraulic devices and wherein the hydraulic fluid comprises glycol.

6. The vehicle system of claim 1, further comprising a controller operable to control a system operation mode based on a plurality of vehicle operation parameters.

7. The vehicle system of claim 6, wherein the system operation mode includes operating each of the plurality of hydraulic devices independently such that at least one of the plurality of hydraulic devices operates as the hydraulic coupling and at least one of the plurality of hydraulic devices operates as the vane pump at a same time.

8. The vehicle system of claim 6, wherein the system operation mode includes operating the plurality of hydraulic devices together as either the hydraulic coupling or the vane pump at a same time.

9. The vehicle system of claim 6, wherein the system operation mode comprises controlling the plurality of hydraulic devices and the one or more accessories in one or more of a tandem torque amplifying wheel drive mode, a tandem steady state wheel drive mode, a tandem vane pumping mode, a regenerative energy storage mode, a regenerative energy application mode, and a tandem wheel drive and vane pumping mode.

10. The vehicle system of claim 1, wherein the plurality of hydraulic devices are arranged in series.

11. The vehicle system of claim 1, wherein the plurality of hydraulic devices are arranged in parallel and the at least one output shaft comprises a plurality of output shafts and further comprising:
an output gear assembly, each output gear of the assembly coupled to one of the plurality of output shafts; and
a clutch and brake assembly disposed between each of the plurality of hydraulic devices and each output gear, each clutch and brake assembly is configured to isolate an associated output gear from an associated hydraulic device to allow the associated hydraulic device to operate as one of the vane pumps.

12. A method comprising:
providing a plurality of hydraulic devices for a vehicle, each hydraulic device configured to be operable as a hydraulic coupling and a vane pump; and
controlling the plurality of hydraulic devices to operate together as either the hydraulic coupling or vane pump by controlling each of the hydraulic devices to operate independently such that at least one of the plurality of hydraulic devices operates as the hydraulic coupling and at least one of the plurality of hydraulic devices operates as the vane pump based on a plurality of vehicle operation parameters.

13. The method of claim 12, comprising pumping a hydraulic fluid from the plurality of hydraulic devices to one or more accessories.

14. The method of claim 13, comprising controlling the plurality of hydraulic devices and the one or more accessories for operation in a plurality of operation modes the operation modes including two or more of a tandem torque amplifying wheel drive mode, a tandem steady state wheel drive mode, a tandem vane pumping mode, a regenerative energy storage mode, a regenerative energy application mode, and a tandem wheel drive and vane pumping mode.

15. A vehicle system comprising:
a torque producer coupled to at least one input shaft;
a transmission coupled to at least one output shaft;
a plurality of hydraulic devices disposed between the torque producer and the transmission, the plurality of hydraulic devices configured to be operable as vane pumps in a first mode of operation and configured to be operable as hydraulic couplings to couple the at least one input shaft with the at least one output shaft in a second mode of operation, wherein the plurality of hydraulic devices are configured for tandem operation in a plurality of system operation modes; and
a plurality of accessories in fluid communication with the plurality of hydraulic devices and configured to receive a hydraulic fluid pumped from one or more the plurality of hydraulic devices when operating as the vane pumps, wherein the plurality of accessories are configured for operation with the plurality of hydraulic devices in the plurality of operation modes.

16. The vehicle system of claim 15, wherein the plurality of system operation modes for the hydraulic devices and the plurality of accessories include one or more of a tandem torque amplifying wheel drive mode, a tandem steady state wheel drive mode, a tandem vane pumping mode, a regenerative energy storage mode, a regenerative energy application mode, and a tandem wheel drive and vane pumping mode.

17. The vehicle system of claim 15, wherein the plurality of accessories includes a transmission, and wherein a fluid communicating interior portion of at least one of the plurality of hydraulic devices and the transmission are coated in a diamond or diamond-like carbon.

18. The vehicle system of claim 17, wherein the fluid communicating interior portion includes a roller bearing of each of the plurality of hydraulic devices and an inner face of a gear ring of the transmission and wherein the hydraulic fluid comprises glycol.

19. The vehicle system of claim 15, wherein tandem operation in the plurality of system operation modes includes operating each of the plurality of hydraulic devices independently such that at least one of the hydraulic devices operates as the hydraulic coupling and at least one of the hydraulic devices operates as the vane pump at a same time.

20. The vehicle system of claim 15, wherein tandem operation in the plurality of system operation modes includes operating the plurality of hydraulic devices together as either the hydraulic coupling or the vane pump at a same time.

21. The vehicle system of claim 15, wherein the plurality of hydraulic devices are arranged in series.

22. The vehicle system of claim 15, wherein the plurality of hydraulic devices are arranged in parallel and the at least one output shaft comprises a plurality of output shafts and further comprising:
an output gear assembly, each output gear of the assembly coupled to one of the at least one output shafts; and
a clutch and brake assembly disposed between each of the plurality of hydraulic devices and each output gear, each clutch and brake assembly is configured to isolate an associated output gear from an associated hydraulic device to allow the associated hydraulic device to operate as one of the vane pumps.

* * * * *